US011109111B2

(12) United States Patent
Selfors

(10) Patent No.: US 11,109,111 B2
(45) Date of Patent: Aug. 31, 2021

(54) EVENT-DRIVEN STREAMING MEDIA INTERACTIVITY

(71) Applicant: FlickRay, Inc., Sherborn, MA (US)

(72) Inventor: Steven Selfors, Miami, FL (US)

(73) Assignee: FlickRay, Inc., Sherborn, MA (US)

( * ) Notice: Subject to any disclaimer, the term of this patent is extended or adjusted under 35 U.S.C. 154(b) by 0 days.

(21) Appl. No.: 16/955,523

(22) PCT Filed: Nov. 27, 2018

(86) PCT No.: PCT/US2018/062609
§ 371 (c)(1),
(2) Date: Jun. 18, 2020

(87) PCT Pub. No.: WO2019/125704
PCT Pub. Date: Jun. 27, 2019

(65) Prior Publication Data
US 2021/0014575 A1    Jan. 14, 2021

Related U.S. Application Data

(60) Provisional application No. 62/608,036, filed on Dec. 20, 2017.

(51) Int. Cl.
*H04N 21/488* (2011.01)
*H04N 21/472* (2011.01)
*H04N 21/485* (2011.01)

(52) U.S. Cl.
CPC ... *H04N 21/4884* (2013.01); *H04N 21/47202* (2013.01); *H04N 21/47217* (2013.01); *H04N 21/4856* (2013.01)

(58) Field of Classification Search
CPC ......... H04N 21/4884; H04N 21/47202; H04N 21/47217; H04N 21/4856; H04N 21/4333; H04N 21/431
See application file for complete search history.

(56) References Cited

U.S. PATENT DOCUMENTS 5,481,296 A    1/1996   Cragun et al.
5,561,457 A    10/1996   Cragun et al.
(Continued)

OTHER PUBLICATIONS

Google. Search helps you find key moments in videos. Retrieved from https://blog.google/products/search/key-moments-video-search/.
(Continued)

*Primary Examiner* — Eric J Yoon
(74) *Attorney, Agent, or Firm* — Banner & Witcoff, Ltd.

(57) ABSTRACT

Aspects described herein may provide systems, methods, and device for facilitating language learning using videos. Subtitles may be displayed in a first, target language or a second, native language during display of the video. On a pause event, both the target language subtitle and the native language subtitle may be displayed simultaneously to facilitate understanding. While paused, a user may select an option to be provided with additional contextual information indicating usage and context associated with one or more words of the target language subtitle. The user may navigate through previous and next subtitles with additional contextual information while the video is paused. Other aspects may allow users to create auto-continuous video loops of definable duration, and may allow users to generate video segments by searching an entire database of subtitle text, and may allow users create, save, share, and search video loops.

20 Claims, 30 Drawing Sheets

(56) References Cited

U.S. PATENT DOCUMENTS

| | | |
|---|---|---|
| 5,614,940 A | 3/1997 | Cobbley et al. |
| 5,859,662 A | 1/1999 | Cragun et al. |
| 6,175,840 B1 | 1/2001 | Chen et al. |
| 6,631,522 B1 | 10/2003 | Erdelyi |
| 7,466,334 B1 | 12/2008 | Baba |
| 7,965,923 B2 | 6/2011 | Sarukkai |
| 8,078,034 B2 | 12/2011 | Champel et al. |
| 8,140,544 B2 | 3/2012 | Barton et al. |
| 8,171,509 B1 | 5/2012 | Girouard et al. |
| 8,479,246 B2 | 7/2013 | Hudson et al. |
| 8,620,139 B2 | 12/2013 | Li et al. |
| 8,649,661 B2 | 2/2014 | Kang et al. |
| 8,774,596 B2 | 7/2014 | Kurupacheril et al. |
| 9,015,147 B2 | 4/2015 | Curtis |
| 9,031,927 B2 | 5/2015 | Kaushal et al. |
| 9,042,703 B2 | 5/2015 | Gibbon et al. |
| 9,047,375 B2 | 6/2015 | Jin et al. |
| 9,171,545 B2 | 10/2015 | Basso et al. |
| 9,237,386 B2 | 1/2016 | Oztaskent et al. |
| 9,275,150 B2 | 3/2016 | English et al. |
| 9,459,527 B1 | 10/2016 | Broxton et al. |
| 9,535,990 B2 | 1/2017 | Skolicki |
| 9,544,528 B2 | 1/2017 | Gharachorloo et al. |
| 9,560,414 B1 | 1/2017 | Chalasani et al. |
| 9,628,873 B2 | 4/2017 | Hu et al. |
| 9,743,144 B2 | 8/2017 | Gibbon et al. |
| 10,116,981 B2 | 10/2018 | Jassin et al. |
| 10,133,819 B2 | 11/2018 | Goikhman et al. |
| 10,162,889 B2 | 12/2018 | Checkley et al. |
| 10,311,101 B2 | 6/2019 | Liu |
| 10,467,289 B2 | 11/2019 | Ambwani et al. |
| 10,509,822 B2 | 12/2019 | Ong et al. |
| 10,606,887 B2 | 3/2020 | Soni et al. |
| 10,642,892 B2 | 5/2020 | Xiao et al. |
| 10,791,375 B2 | 9/2020 | Kaushal et al. |
| 10,878,280 B2 | 12/2020 | Koval et al. |
| 2004/0128342 A1 | 7/2004 | Maes et al. |
| 2004/0152055 A1 | 8/2004 | Gliessner et al. |
| 2005/0050515 A1 | 3/2005 | Shah et al. |
| 2005/0162551 A1 | 7/2005 | Baker |
| 2006/0002684 A1* | 1/2006 | Champel ............... G11B 27/34 386/243 |
| 2012/0072958 A1 | 3/2012 | Smyth et al. |
| 2012/0254932 A1* | 10/2012 | Hudson ............. H04N 21/4722 725/112 |
| 2012/0276504 A1 | 11/2012 | Chen et al. |
| 2013/0177891 A1 | 7/2013 | Hammerschmidt |
| 2014/0038142 A1* | 2/2014 | Chang ..................... G09B 5/06 434/156 |
| 2014/0178046 A1* | 6/2014 | Abe ..................... G11B 27/105 386/244 |
| 2015/0093093 A1 | 4/2015 | Abecassis |
| 2015/0100300 A1 | 4/2015 | Nazarian et al. |
| 2016/0133154 A1 | 5/2016 | Cortes et al. |

OTHER PUBLICATIONS

Vanderplank, Robert. "Déjà vu? A decade of research on language laboratories, television and video in language learning." In: Language teaching. Dec. 10, 2009 (Dec. 10, 2009) Retrieved on Mar. 4, 2019 (Mar. 4, 2019) from <http:J/kllc.ir/Content/UserPics/FileUpload/636007297697676119.pdf> entire document.

Mar. 25, 2019—PCT/US2018/062609—ISR & WO.

FluentU. Language Immersion Online | Learn a Language with Videos. Retrieved from https://www.fluentu.com/en/.

SourceNext. Windows version Main features | Learn English with movies Super subtitles | SourceNext General Site. Retrieved from https://www.sourcenext.com/product/chj/pc/function/#L1.

\* cited by examiner

Example 1. | John (pn) resembled* <u>a deer in the headlights</u> during his presentation.

Example 2. | I <u>was</u> {not only} wicked cold, {but also} afraid (j).

FIG. 8

EVENT-DRIVEN STREAMING MEDIA INTERACTIVITY

CROSS-REFERENCE TO RELATED CASES

This application is a U.S. National Stage application under 35 U.S.C. § 371 of International Application PCT/US2018/062609 (published as WO 2019/125704 Al), filed Nov. 27, 2018, which claims the benefit of priority to U.S. Provisional Patent Application No. 62/608,036, filed Dec. 20, 2017, entitled "Systems and Methods for Foreign Language Learning." Benefit of the filing date of each of these prior applications is hereby claimed. Each of these prior applications is hereby incorporated by reference in its entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Attaining proficiency or fluency in a foreign language requires students to invest significant time, effort, and money in their pursuit. Even a modest level of proficiency requires both classroom study and extracurricular effort. In the case of English, widely considered the lingua franca of international business, learning motivations are varied and include college acceptance, career advancement, foreign travel, and cultural curiosity, among many others.

In terms of the foreign language learning process, many students augment classroom studies by viewing videos from the country of interest. For example, Japanese students learning English watch American TV and movies. In fact, most people who are fluent in the American English dialect have viewed thousands of hours of video programming produced by American media giants.

The primary purpose of subtitles in TV programming is to enable entertainment. Hence for broadest adoption and highest learning impact, a foreign language learning system should not interfere with the entertainment value and should not alter the video viewing experience from well-established norms. As an example, full-screen video on a tablet device or PC is a baseline capability for viewing TV programming on such devices. Therefore, full-screen viewing should be seamlessly incorporated in the learning method.

Beyond entertainment, TV programs and movies ("TV or TV programming") can be instructional when subtitles are enabled. For example, while watching the famous Hollywood movie Top Gun, a student could pause the video containing English subtitles, and then manually look up a particular subtitle word by typing the word into an online dictionary. But this disconnected method is slow and tedious and offers little help in understanding the word in the context of the subtitle, i.e. the as-uttered meaning. Furthermore, precise lexical semantics and a full depth of pedagogical information for each subtitle, word, and phrase are required a) to understand the meaning expressed by the subtitle, and b) to apply the words and phrases correctly and appropriately in actual communications. But with current methods, such information is unavailable while viewing TV programming.

The problem with learning a foreign language by viewing TV is further complicated by the multiplicity of definitions for individual words, special uses, phrases, idioms, slang, sarcasm, and/or colloquialisms. Take for example the task of looking up the definition of a seemingly simple word "set" within a subtitle. When the viewer takes the initiative to open an electronic translation dictionary, a terribly slow inconvenience, to find the meaning of the word "set", she is presented with 67 unique definitions. But how is the learner to know which of the 67 definitions is appropriate in the context of a specific subtitle? Presented with a long list of potential meanings, the user resorts to guessing at best. Repeat this situation for each and every word that a student desires to learn from subtitles and the tremendous inefficiency illustrates the impediments in using video for linguistic learning.

The learning challenge is even more pronounced for phrases and idioms, which are critically important in the English language. As a further illustrative example, a TV viewer would not know that a particular subtitle—"it's cool"—used in a specific context, means: go ahead, as in permission, and that it's only used as informal speech among peers or with subordinates, but rarely if ever to one's superiors in a professional setting. Further complicating the learning process, the fact that "it's cool" is an idiom is not clear, so if the user were to simply look up the meaning of the "it's" and "cool", the meaning would be completely lost because the subtitle display itself does not indicate that "it's cool" is in fact an idiom. Similar problems arise with commonly used phrases.

In some languages such as English, formality rules are undocumented. Therefore, use of subtitles as learning material is potentially embarrassing for the intrepid learner, who could easily insult someone via misusage. In contrast, other languages such as Japanese have documented morphologies with respect to formality; that is to say, the words themselves change to reflect higher or lower formality e.g. there are totally different words to ask for something from a superior versus a friend, and these rules are easy to learn since they are documented in the morphology of the Japanese language. But in English and other languages, formality must be learned from immersion in the culture since morphology plays little or no role.

In traditional language learning materials, a proposed lexicon is presented to the learner in the form of vocabulary lists. But as the student moves beyond rudimentary words or phrases, it's unclear which words or phrases should be given learning priority. Students therefore, cannot optimize their study time because they spend time and energy learning words that are less useful in the practical application of the language.

Precise lexical semantics and a full depth of pedagogical information for each subtitle word and phrase may require identification and presentation of: part of speech (e.g. nouns, adjectives, verbs, verb phrases, adverbs, conjunctions, prepositions), lexemes, idioms, phrases, metaphors, similes, clauses, verb conjugation, pronunciation, slang, crude speech, corrections to proper grammatical and spoken form, usage formality level (e.g. used only among friends and not to superiors), priority (e.g. the relative value in learning that word or phrase vis-à-vis all others), word-sense disambiguation (e.g. the specific meaning of a word or phrase as uttered in a specific subtitle), translations of the disambiguated word or phrase meaning into the user's native language, pronunciation of the lexical units, common sentence structures (e.g. "not only . . . ," "but also . . . "), further example sentences for words and phrases of the subtitles in the same context as the subtitle utterance, and/or translations of the further example sentences into the user's native language.

Without immediate, interactive and convenient access to comprehensive lexical information for the currently viewed subtitle, the student may be left to her own devices in terms of comprehending subtitles and using them in daily communication. Ill-suited tools such as dictionaries and thesauri offer a list of meanings that have no relationship to a specific context within a TV program, and therefore heavily burden the learner. Consider the subtitle: "Your dog tracked mud on my carpet, beautiful." Clearly the speaker is not saying that the mud is a wonderful addition to the carpet, thus illustrating the need for a system that presents contextualized pedagogical information to the viewer.

Further difficulties in using video for language learning are found in the existing media player technologies. Current player technologies were designed for passive viewing. But learning from video requires novel interactive methods. As an illustration, it's well understood that learning is accomplished via repetition. But repetition is difficult with current player technology because replaying short video segments multiple times requires manual user intervention for each desired replay. These difficulties are multiplied by the number of times that a student would like to learn from short video segments. Furthermore, each learner may have a different loop duration preference. Yet current video players do not allow users to loop video segments continuously based on configurable video player settings for loop duration. With current approaches looping is an all-or-nothing proposition, i.e. the entire video is looped (similar to digital music players that loop entire songs). Furthermore, player back functions are manual and hard-wired for a specific duration, often 30 seconds.

Still further problems arise because video is often viewed on large screen TVs. Although usually best for viewing pleasure, reading textual pedagogical information such as word definitions or pronunciation keys from ten feet across a room while relaxing on a couch may not be an optimal interactive learning experience that works due to eyestrain and limitations of proprietary remote-control devices. Language learning therefore may benefit from a novel combination of arm's length reading of lexical information optionally coupled with, but physically separate from, a large screen used for video viewing pleasure.

Other attempts to use video for language learning force users into user experiences that may severely harm the entertainment value of video, thus weakening the impression made by the video and thereby inhibiting the user's ability to memorize words, phrases, and sentence structures. Perhaps more importantly, content owners such as the major Hollywood studios are unlikely to license content to video on demand (VOD) platforms that harm the entertainment value of their TV programming. For example, some techniques render subtitles in two languages in a view area separate from the video display area (i.e. subtitles are not overlaid on the video). Moreover, such techniques are not full-screen video experiences (a substantial part of the screen is dedicated to subtitles and the other part to video display), which further diminishes viewing pleasure, and may not be widely acceptable to content owners i.e. major TV and movie production studios.

Still other complications arise from a language teacher's perspective. Creating and sharing short video segments, and authoring related interactive questions, usually requires sophisticated video editing tools, custom software programming, content management systems, and streaming video infrastructure that are far too complicated, costly, and time consuming for the typical language instructor or language school.

Learning a foreign language is a long and lonely journey, so having the presence and support of friends during the years leading to proficiency may enhance the user's engagement, dedication, interest, and enjoyment. While general-purpose social networks connect friends, they don't connect fellow language learners in an interactive community of like-minded language learners who share the joy of ad-hoc learning and discovery by sharing linguistic TV programming segments defined by the users themselves.

Often overlooked in foreign language studies is the proper pronunciation of the target language (i.e. the foreign language to the learner). Teacher-student feedback mechanisms are limited to the classroom, i.e. synchronous feedback, with the result that pronunciation is often weak even in countries with strong second language skills. For example, many Germans speak fluent English, but their pronunciation of the American English dialect is sometimes poor.

Given these significant learning challenges in using TV programming for foreign language learning, a clear need exists for novel systems and methods that enable students to learn foreign languages within a highly efficient, social, interactive system.

BRIEF SUMMARY

Aspects described herein address these and other problems. Systems and methods are described for improving foreign language learning using TV programming through novel features related to display and processing of subtitles. Systems and methods are described related to search, retrieval, display, and interaction with contextual information associated with subtitles. Aspects described herein may be implemented and/or embodied in "Subtitle Markup Language" (SML), a markup language related to subtitles within streaming media that may be used to provide contextual information. In some embodiments, SML may be comprised of at least an in-context definition for words or phrases within the corresponding target language subtitle. Aspects herein may be applied to various types of media, including streaming video and streaming audio. It should be noted that those with ordinary skill in the art often use the term subtitles interchangeably with the term captions.

Some aspects may provide a method of displaying recent subtitles with a native language translation and additional contextual information. Such a method may comprise streaming media (e.g. streaming video and streaming audio) over an IP network. The streaming media may be displayed, and subtitles in a first selectable language (e.g. a target language) may be displayed during streaming by overlaying on a media player running on a device (such as an electronically networked device). The method may comprise responding to an on-pause media player event by retrieving the most recent target language subtitle (with optional Hint SML) and its native language translation. Both the target language subtitle and its native language translation may be displayed simultaneously in a controller app while the stream is paused. Additionally, the system may display linguistically contextualized information (SML) related to the same most recent target language subtitle, such as in response to user input or other signal indicating that contextual information is desired.

Some embodiments may provide a method for stepping through subtitles with contextual information. Such a method may comprise retrieving while the streaming is paused, further contextual information (e.g. Hint SML and SML) associated with a previous or next subtitle within the media stream. Subtitles and associated contextual information may be retrieved one-by-one as the user steps through. The user may be allowed to move forward and/or backwards through the subtitles of the streaming media. The method may query a database, or otherwise request, the contextual information to be retrieved. The retrieved contextual information may be displayed over the paused media. In some implementations, the video may remain on a paused frame even as the subtitles are stepped forward or backwards.

Some aspects may provide methods that enable the creation, storage, sharing and streaming of media segments defined by metadata that are related to original source video or audio streams. For example, the system may allow users to create a media segment from a source video without generating further picture or sound data files. Segment metadata, used to define a media segment, may comprise a unique database identifier for the source full-length media asset, start and end time points of the media segment, date-time of creation, user-id of segment creator, recipient user-ids, and/or notes associated with the segment by a user.

Some embodiments may provide a method that enables subtitles contained within the time range of a video segment to be retrieved on demand from a cloud (or remote) backend and viewed one-by-one. The subtitles may be retrieved and/or displayed without playing the video segment. For example, the target language subtitle, associated translation, and related contextual information (SML) may be displayed and viewed without streaming the media.

According to some aspects, the system may provide a user configurable, auto-continuous looping feature. The auto-continuous looping feature may allow for display of continuous loops of short media segments of a user-defined duration. Creation of the continuous loop may be automatic and/or based on a text search query for a word or set of words, such that no further user interaction is required to, for example, define the specific loop requested or otherwise create a media segment.

Some aspects may provide a method to insert, at appropriate streaming media time points, questions to assist the user in foreign language learning. The questions may be inserted at defined streaming media time points and may have an associated difficulty level. The questions may be inserted such that question events automatically pause the media player to prompt the user to respond to the question. The system may store user responses to such questions, and the system may analyze user responses for the purpose of measuring the comprehension level of system users.

Some embodiments may incorporate and/or provide an application programming interface (API) whereby third-party media players may retrieve contextual information (e.g., SML) upon a media player event (such as an onPause event).

BRIEF DESCRIPTION OF THE DRAWINGS

A more complete understanding of aspects described herein, and the advantages thereof may be acquired by referring to the following description in consideration of the accompanying drawings, in which like reference numbers indicate like features, and wherein:

FIG. 8 provides illustrative examples of Hint SML, according to some examples.

DETAILED DESCRIPTION OF PREFERRED EMBODIMENTS

It should be noted that examples provided in the specification and references to figures are intended to be exemplary only and not intended to limit the scope of the invention.

According to some aspects, the system may be comprised of a controller device and a controller app running on the controller device. Video may stream to the controller device from a cloud backend. If no subtitles are chosen for display, the user may be said to be in natural mode which may provide the most challenging immersive experience. For further learning assistance, the user may stream video and choose to display subtitles in the target language or in the user's native language thereby entering subtitle mode. When the user sees and hears a learning opportunity and desires even further learning assistance, the user may pause the video by applying a gesture to the play/pause button on the video player control bar and/or by applying a gesture (e.g. touching) to the video display area thereby entering paused video mode. A GET request may then be sent to a REST API endpoint of the cloud backend, which may send a response with the data required for both paused video mode and in-depth mode. Such data may include the target language subtitle, its Hint SML, the native language subtitle, and the SML for all lexical units in the target language subtitle. A subset of the response may then automatically be rendered as an overlay display comprising the text of the target language subtitle, its Hint SML, and/or the text of the native language subtitle, while retaining in device memory the entire response that included the SML. When the user sees interesting Hint SML or a word of interest, and desires to study the underlying contextualized meaning of a word or phrase, the user may select the "Show All SML" button from the video player control bar and enter in-depth mode, where a scrollable pop-over window may render the SML from memory. The hierarchy of user-selectable language learning modes, according to some aspects, may adhere to technical requirements required to license and incorporate TV programming video 102 in the system, such as studio-quality encryption and digital rights management (DRM), full-screen video in all appropriate resolutions, user-selectable subtitle tracks, and geo-fencing.

These and other features are described herein with reference to the figures.

Figure 1:
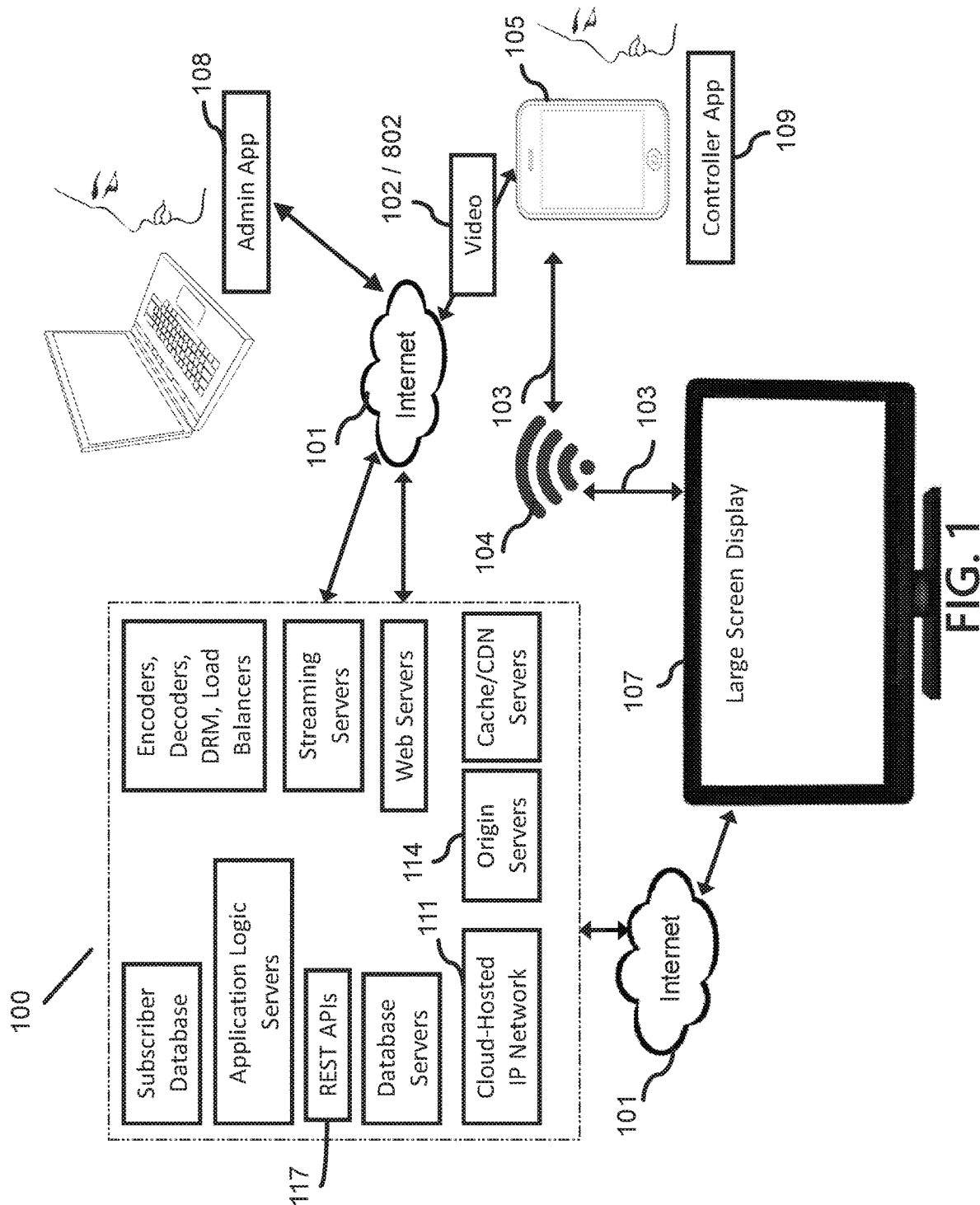
FIG. 1 illustrates an example schematic overview of system infrastructure.

FIG. 1 shows a schematic overview of a system infrastructure that may be used to implement one or more aspects of the language learning systems described herein. In some implementations, a cloud backend 100 may allow a language learning system to deliver multi-bitrate, full-screen capable streaming video 102 (with audio) over the Internet 101. The cloud backend 100 (sometimes referred to as a backend server) may be comprised of several components, such as VOD streaming origin servers 114, distributed and local data caches, cache servers, content servers, content delivery network (CDN) streaming servers (e.g. to store and serve segmented video files for HTTP-based streaming), business logic servers, search servers, physical servers, virtual servers, API endpoint servers, load balancers, storage systems, video encoders, digital rights management servers (DRM servers), database servers for various content storage such as the video catalogue, application servers, logic servers, REST API endpoints 117, native application programming interfaces (native APIs), messaging servers (MOM), and/or chat servers.

Cloud backend 100 may support management and retrieval functions enabling operation of the language learning system. For example, cloud backend 100 may manage and/or retrieve data related to video metadata 307, subscriber (user) profiles, user management, user generated content, user payment services and gateways, media players, video encoders, decoders, video metadata, video thumbnails, video artwork, promotional assets, media encryption, recommendation engines, decryption, firewalls, saved video segments, saved friends lists, saved teachers lists, students list, user profiles, user defined configuration player options 610, comprehension questions, question responses and results, user analytics, sound files, system administrative applications 108 enabling SML and Hint SML creation, editing and persistence, system storage and cloud management, content management system, workflow management system, translation management system, system health monitoring, elastic cloud services, and/or third party APIs.

Cloud backend 100 is illustrated as hosting various backend servers and software services and electronic networks that may be required to operate the VOD system. The system of FIG. 1 further includes a controller device 105 connected to a WiFi and/or cellular network and communicating with cloud backend 100 over the Internet 101. Video may be streamed from the origin servers 114 and cache/CDN servers to a controller app 109 running on a controller device 105. In some implementations, controller app 109 may make REST API 117 requests for video segment data, system data, and/or user generated content, the display of which may be rendered on the controller app 109. Displays of the controller app 109 may be cast over a Wi-Fi network 104 via a sender/receiver protocol 103 to large screen devices 107, in some embodiments. FIG. 1 illustrates multiple computing networks functioning together to form the underlying system communication fabric for a VOD streaming system; illustrated networks include the Internet 101, a cloud-hosted private network 111 for the cloud backend software and hardware required to manage and stream video 102 on-demand to a massive community of users, a local WiFi network 104, and a content delivery network (CDN).

The controller app 109 may provide the end user interface in the language learning system. The controller app 109 may be implemented on controller device 105. Controller device 105 may be any suitable computing device, such as a computing device with memory, processor, networking, and display capabilities. Controller app 109 may run on a wide variety of controller devices 105, such as laptops. PCs, Macs, tablets, mobile phones, smart phones, and/or smart TVs. Controller app 109 may be compatible with standard casting devices (e.g. via Google Chromecast), enabling the controller app 109 to mirror its display to large screens or portions of its content or display to large screens (e.g. an ultra HD or HDTV, smart TV, or other large screen device capable of coupling with the controller device 105 over a WiFi network). To assist in broad-based adoption, the controller app 109 may be implemented in all popular client-side software technologies including a dynamically downloaded web app (i.e. Web Browser, HTML, JavaScript, and CSS), an installed Chrome App, and/or an installed native app (i.e. Java, Android, iOS, Windows, Windows Mobile). Controller app 109 may have a persistent or a session-less connection to the cloud backend 100 over known Internet protocols such as HTTPS, HTTP, and TCP/IP, and websockets. The video player may be an HTML5 player in the case where the controller app software runs in a web browser, and a native video player in the case where the controller app software runs as a native application;

FIG. 1 further illustrates an Admin application 108, which may connect with the cloud backend 100 and control and/or edit the content of the system such as the video catalogue, subtitles, and curated content including Hint SML and SML. Within the admin app 108, administrative users (such as content editors) with security privileges may be provided input methods that are used to identify and mark lexical elements with Hint SML. For example, the slang word "wicked" may be marked and identified as slang by an editor and the strikethrough font is applied by the system and stored as Hint SML in the cloud backend 100 for that specific subtitle. The target language of a video (i.e. the original language of the video) may be defined by system admins within the admin app 108 and stored in the cloud backend 100 as video metadata 307. The Admin Application 108 may be implemented in all popular client-side design patterns including a web app (e.g. Web Browser, HTML, JavaScript, and CSS), an installed Chrome App, and an installed native app (i.e. Java, Android, iOS, Windows, Windows Mobile).

According to some aspects, the system illustrated in FIG. 1 may use adaptive bitrate streaming formats with client sent byte range requests transmitted over hypertext transfer protocols (HTTP and/or HTTPS) for encrypted video file segments that are protected by digital rights management (DRM). In this way, backend origin servers 114 may be low cost web servers (i.e. Apache or NGINX) with byte range request capability enabled, for example. On a pause event, the player running within the controller app 109 may terminate byte range requests.

Figure 2:
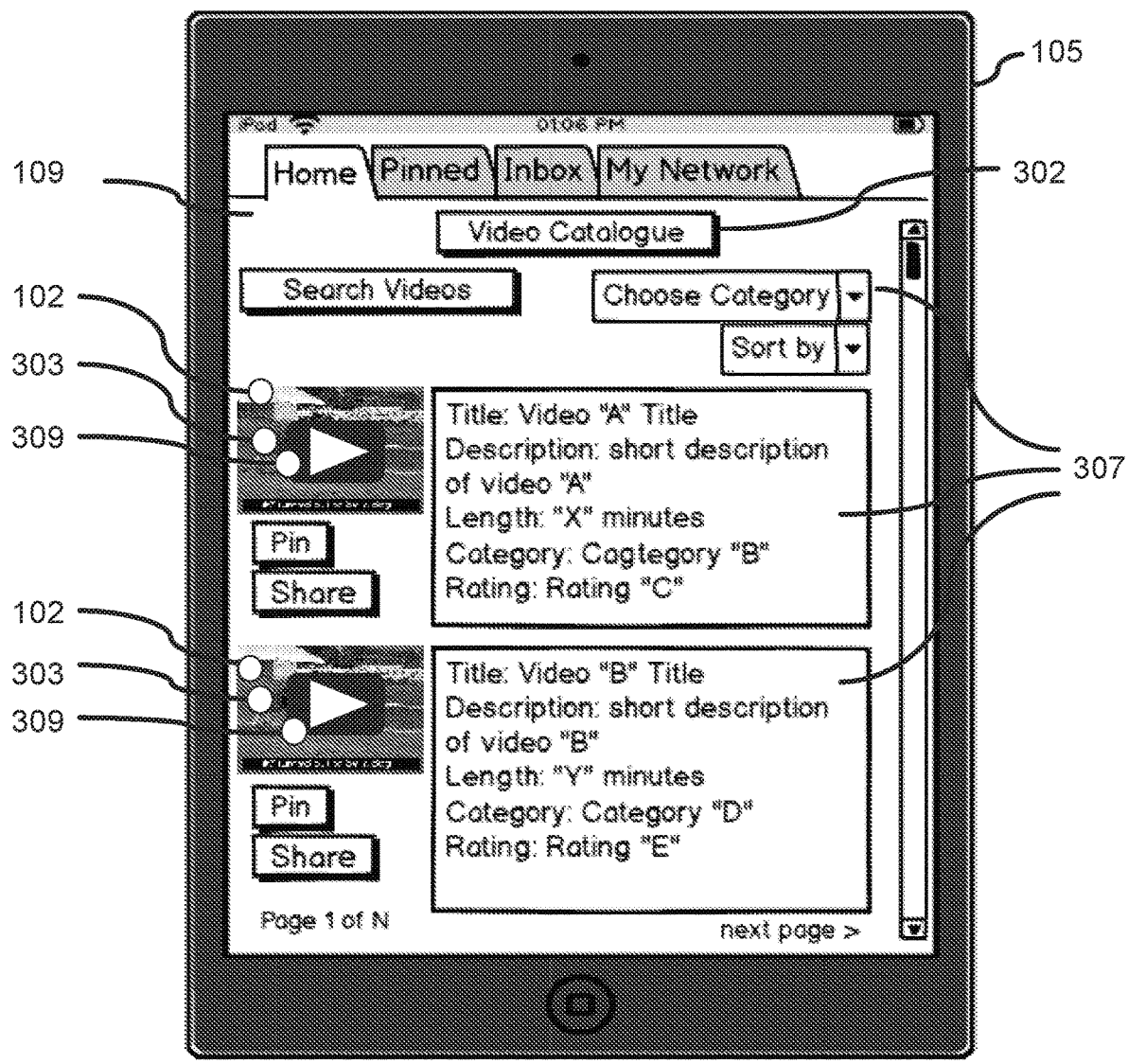
FIG. 2 illustrates an example controller app home screen and video catalogue.

FIG. 2 is an illustrative schematic of a controller app 109 running on a controller device 105. FIG. 2 shows a video catalogue 302 displayed in the controller app 109 home screen that enables browsing the video catalogue 302, such as through filtering and searching the catalogue via metadata 307. The controller app 109 may enable users to browse, search, and select for playback individual videos 102 and video segments 802 of video catalogue 302. In an example implementation, the video catalogue 302 may contain copyrighted professionally produced, full-length TV program episodes and movies (e.g. Hollywood produced TV programming). Video thumbnail images 303 illustrated in FIG. 2 indicate that a video 102 or video segment 802 is available for playback. Thumbnails 303 may be marked visually as video segments 802 to distinguish them from full-length original videos 102. The system may provide of a collection of videos 102 originally produced in a target language (e.g. English) (collectively forming the video catalogue 302) stored in common streaming file formats (e.g., fragmented MP4, and the like), containers, and audio encodings on origin servers 114 in the cloud backend 100, and on an integrated CDN. CDN servers may be globally distributed to ensure low latency streaming to end users throughout the world. The CDN network may be a third party network (i.e. Akamai or Amazon Cloudfront) running outside of the cloud backend 100 private network, in some implementations.

The video catalogue 302 may be organized by video attributes ("video metadata" 307) which are stored in a database in the cloud backend 100. Some video attributes may be displayed on the controller app 109 such that users can use associated metadata to browse and search for videos 102 and video segments 802 stored in the video catalog 302 in the cloud backend 100. Examples of video metadata 307 include unique video ID, a universal resource locator (URL) to the video 102 or video manifest file, target language, available subtitle languages (e.g., native languages), associated questions (through a "question-id"), recently viewed videos (including time points when videos were stopped in the case of partially viewed videos from prior viewing sessions), system generated recommendations, friend's recommendations, video title, category (e.g. action, documentary, drama, news, blockbuster film, TV series), episode or series description including key words and phrases contained therein, links to salient SML 203 in the video 102, age appropriateness (e.g. 3-8 years, 17+), rating (e.g. PG, R, PG13), date range first aired (e.g. 1970s), length of video (e.g. 40 minutes), series sequence number (e.g. season 1, episode 3), video quality (e.g. HD, SD, 4K), subtitle tracks in both target and native languages (e.g. English, Japanese, French, Korean, German) with start and end time points and sequence numbers for individual subtitles, language difficulty level (beginner, intermediate, advanced), predominant subject matter (e.g. daily conversation, business, medical, scientific, politics, law enforcement), audience rating (e.g. 4 star), friend's rating (e.g. 3 star), and teacher's rating (e.g. 5 star).

Figure 3:
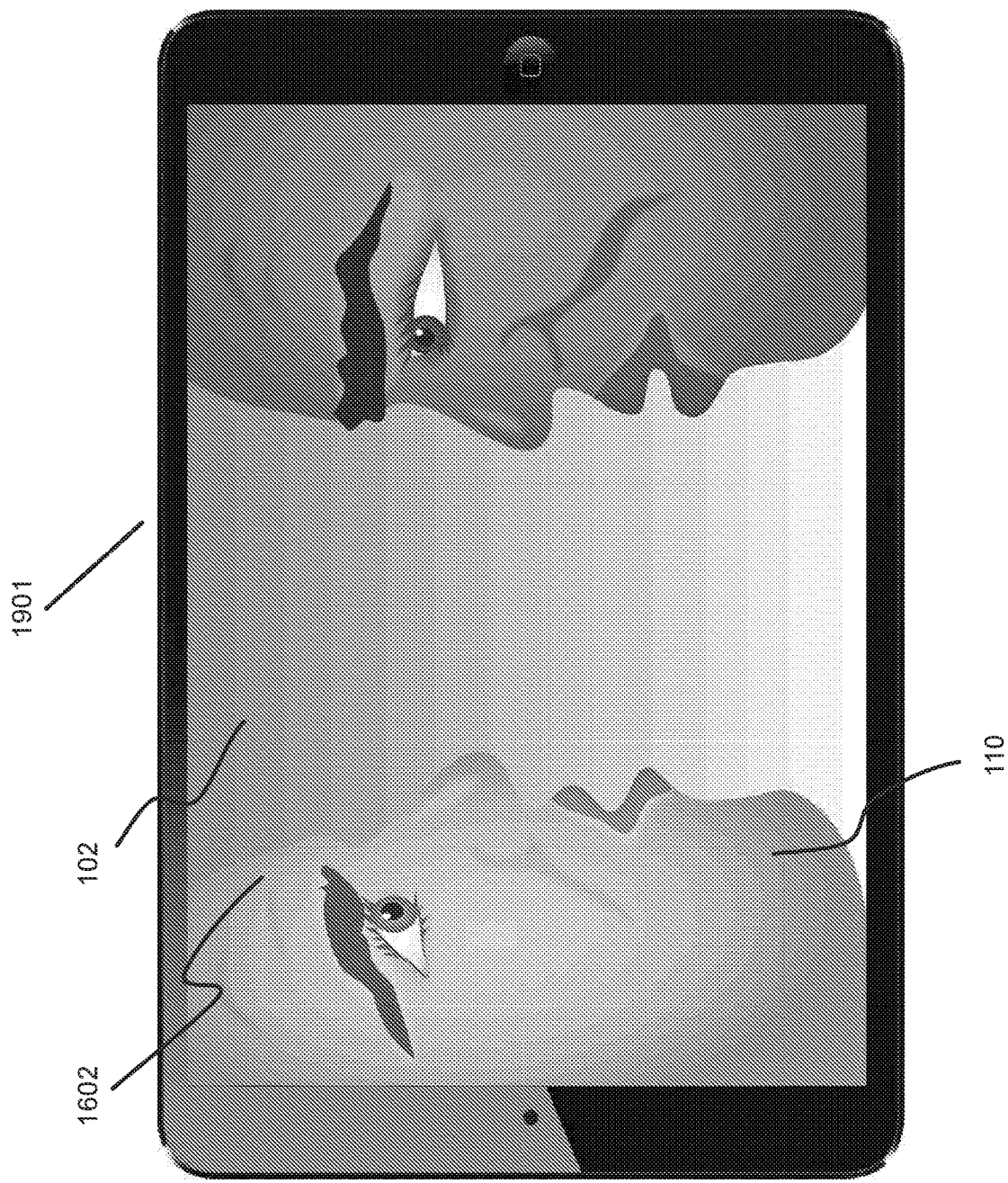
FIG. 3 illustrates a video streaming in full screen without subtitles (e.g. natural mode), according to some examples.

FIG. 2 shows a play video function that may be initiated by applying a gesture (e.g., a mouse click or a tap on a touchscreen) to a play icon 309 overlaid on a video thumbnail, or to the modal play/pause button 501 (illustrated in FIG. 4 et al.), or to an area on the video display area 1602 (illustrated in FIG. 3 et al.). Such an activation gesture sends a play command via a player API 115 to the video player 110 to initiate video streaming requests to the cloud backend 100. A gesture applied to a play icon 309 or a selection anywhere on thumbnail images 303 of videos 102 may launch a video player that loads a corresponding video URL and displays a streaming video in full screen as shown in FIG. 3.

FIG. 3 illustrates an exemplary view of video player 110, which may run within controller app 109 on controller device 105. Video 102 is streamed to the player 110 from the cloud backend 100 and may be displayed in full screen and in the originally produced aspect ratio. The player 110 may make byte range requests over HTTP(S) to the cloud backend 100 which responds to such requests with media data that are rendered for display on the controller device 105. The digital video player 110 in the controller app 109 may have an application programming interface (API) 115 and an event model that enables programmatic control of the video player 110 behavior, appearance, and system integration. In some embodiments, adaptive bitrate streaming protocols over HTTP/HTTPS, are used to optimize the user experience over a wide variety of networks such as 4G LTE and WiFi. One example of an adaptive bitrate streaming system is Apple HTTP Live Streaming (HLS) which incorporates H.264 encoded video and AAC encoded audio which are encapsulated in an MPEG-2 Transport Stream container and served via HTTP from Apache web server software. An HTML5 or native video player 110, running in the controller app 109 on the controller device 105, may connect to the Internet 101 and request the segmented (e.g. discrete .TS files or fragmented MPEG byte ranges) streaming video 102 from the cloud backend 100 via a source URLs 106. The streaming video 102 may be protected during playback by standard encryption and DRM techniques.

According to some embodiments, the language learning system may provide a hierarchy of selectable learning modes within a controller app 109, each described further herein. Such modes may be chosen via user gestures applied to the controller app 109 running on a controller device 105.

FIG. 3 illustrates natural mode 1901 in which streaming videos 102 are displayed without subtitles on the video display area 1602. In this mode, learners may be immersed in the video in a natural method that simulates the full challenge of cultural immersion (i.e. viewing video without assistance of subtitles) since there is no additional information provided to the language learner apart from audio/visual data of the videos 102.

Figure 4:
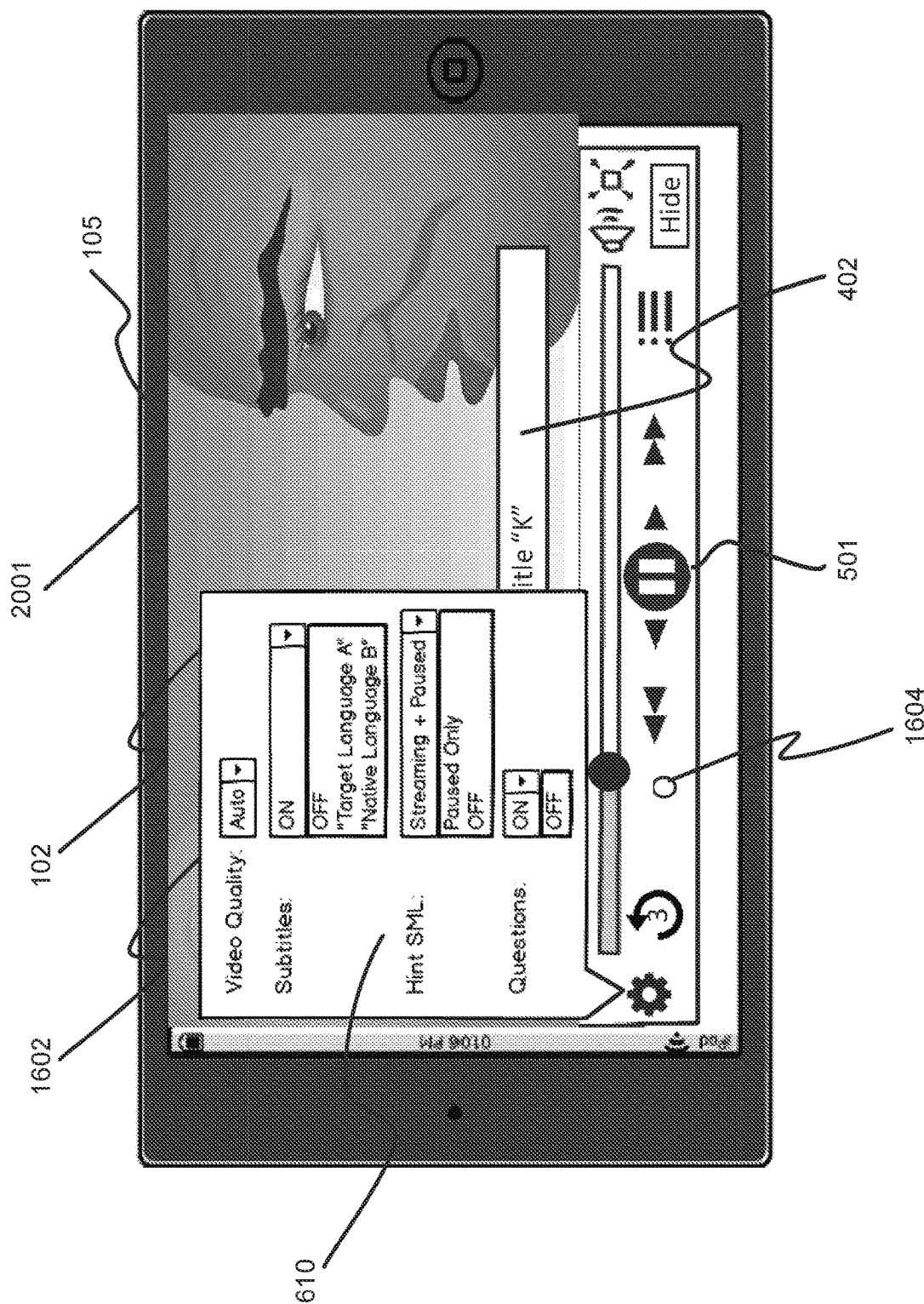
FIG. 4 illustrate a user-configurable video player, according to some examples.

As illustrated in FIG. 4, in some embodiments the language learning system may provide a subtitle mode 2001. Subtitle mode 2001 provides the user with the option to stream videos 102 with subtitles in the user's native language, or if desired with subtitles in the target language of the video 102 thereby providing a first level of assisted learning. FIG. 4 illustrates video player 110 configuration options 610, where subtitle display may be set to target language, native language, or OFF. In the illustrated subtitle mode 2001, subtitles are either OFF or displayed in a single selected language (either target or native language) and overlaid on the video display area 1602. Other configuration options 610 illustrated in the controller app 109 of FIG. 4 include video quality selector e.g. HD or SD, Hint SML 202 display on/off switch, and question display on/off switch.

Figure 5:
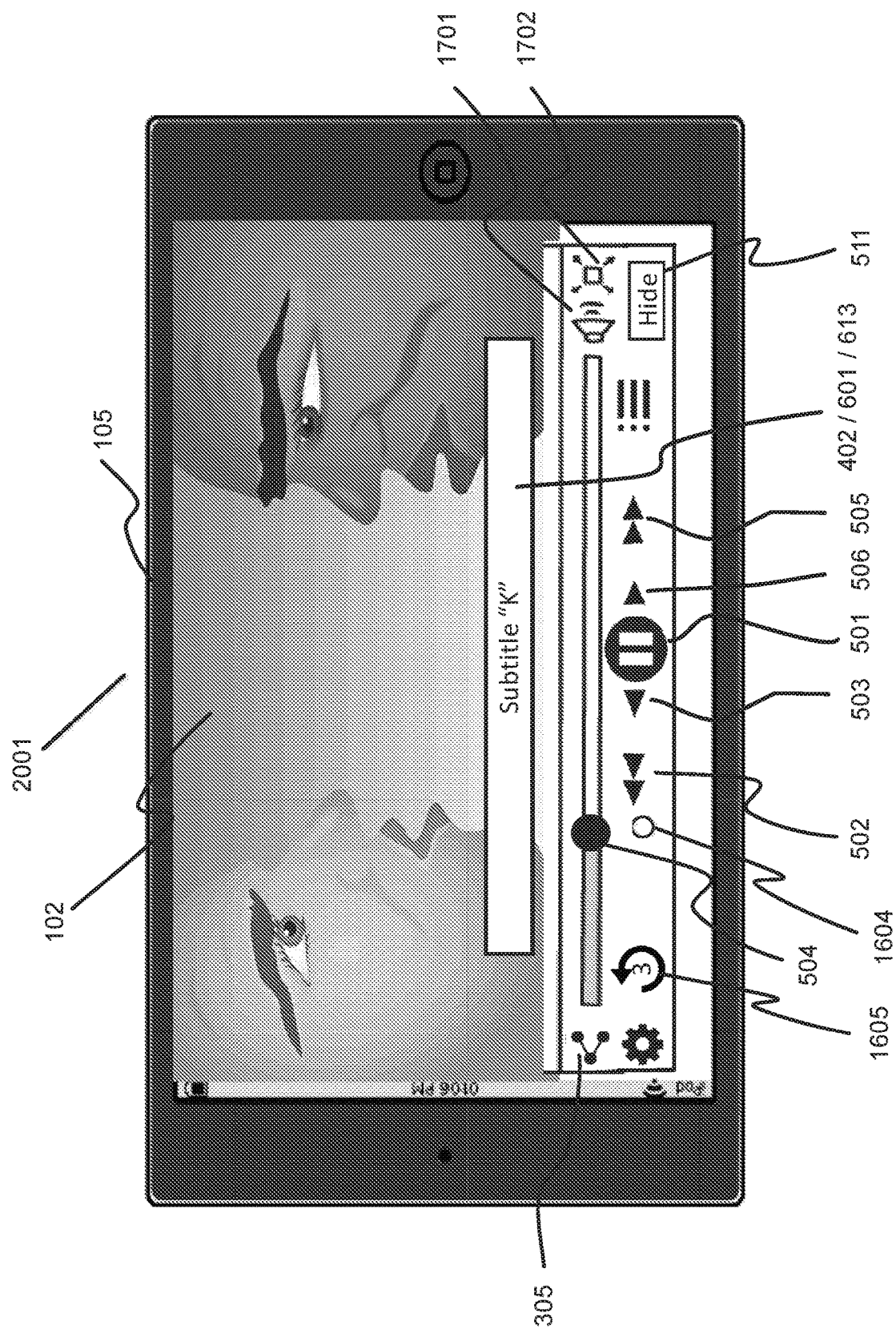
FIG. 5 illustrates a controller app streaming video in a single selectable language (e.g. subtitle mode), according to some examples.

FIG. 5 further illustrates subtitle mode 2001, wherein current subtitles "K" 402 are displayed over a streaming video 102 for finite durations of time while a video 102 is streaming from a cloud backend 100. The language of current subtitles "K" 402 may be selectable from within the video player 110 configuration options 610 shown in FIG. 4. When the current subtitle 402 is displayed in the native language (i.e. mother tongue) of the user, it may be referred to as a native language subtitle 613. When the current subtitle 402 is streaming in the originally produced language of the video 102, it may be referred to as a target language subtitle 601. Digital audio associated with the streaming video 102 may typically be in the originally produced (target) language (i.e. the audio is not dubbed into the user's native language). Though, if the streaming video 102 is associated with multiple audio tracks in different languages, the target language may be in any desired language included in the audio tracks. Following this, current subtitle 402 may be considered a target language subtitle 601 if it is in a language supported by the video and desired to be learned by the user.

Further illustrated in FIG. 5 is a video player control bar 1604 having functions such as modal play/pause 501, player head positioning 507, forward 506, fast forward 505, rewind 503, fast rewind 502, player head positioner 504, video player 110 settings 610, pin (i.e. save)/share video segments 305, loop icon 1605, hide control bar 511, full screen toggle 1702, and volume control 1701. Full-screen toggle switch 1702 may enable the user to enter and depart from full screen streaming. The interactive methods of the illustrated embodiment are full-screen enabled and compatible, thereby maintaining the entertainment value of the video while simultaneously incorporating aspects disclosed herein.

In the subtitle mode 2001, current subtitles 402 may be displayable with or without Hint SML 202. Subtitles may be rasterized into the video 102 or streamed separately as subtitle tracks (e.g. sidecar files) such as WebVTT or other standard streaming subtitle format. A Hint SML 202 display option while streaming may be provided under video player configuration options 610 as illustrated in FIG. 4. Hint SML 202 may be implemented via HTML, or CSS applied to WebVTT, SRT and/or other standard streaming subtitle file formats. The Hint SML 202 text styling may be accomplished with device-specific native approaches if available.

Figure 6:
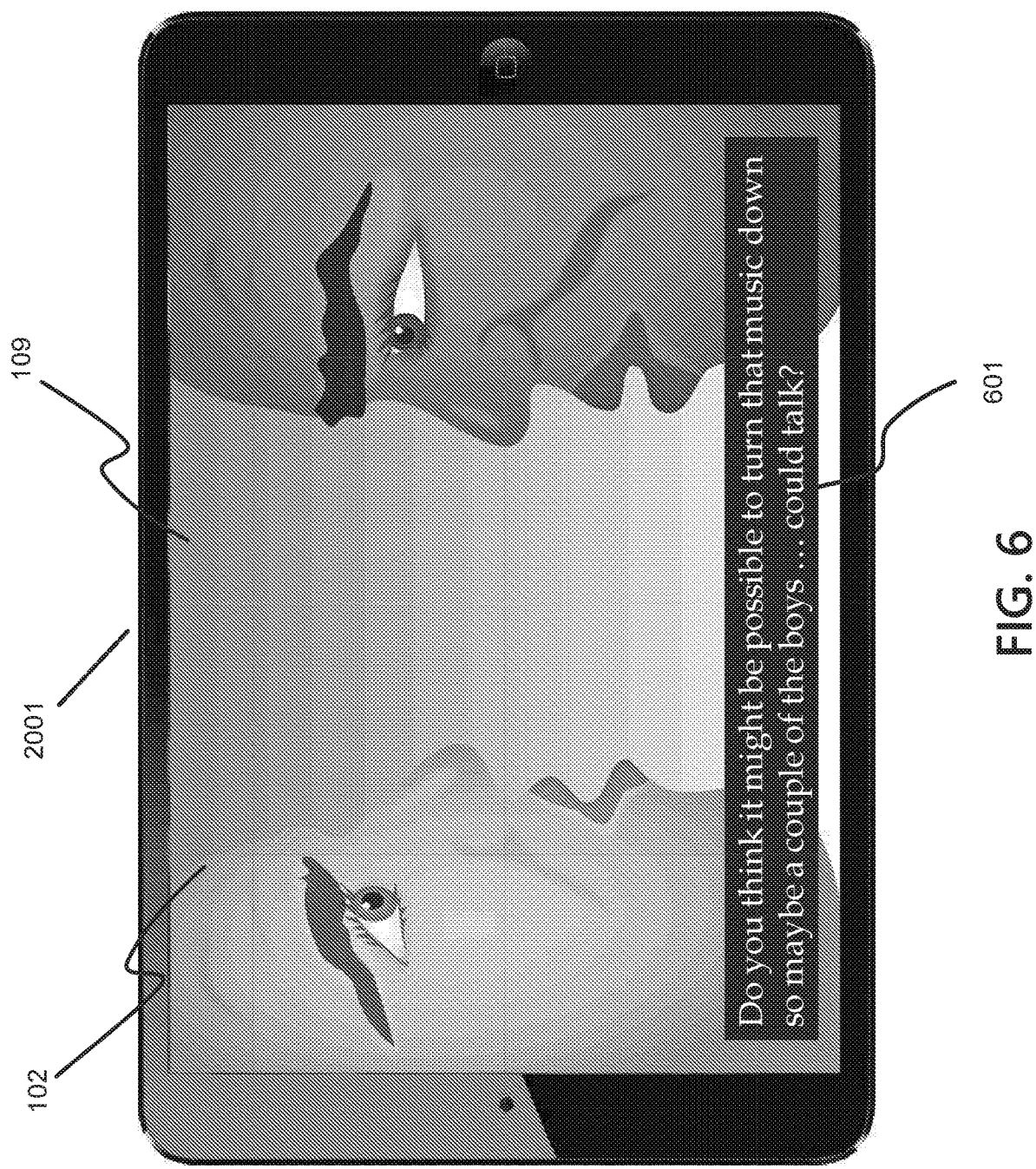
FIG. 6 illustrates an example video with English subtitles (e.g. in subtitle mode).

FIG. 6 is another illustrative example of subtitle mode 2001. FIG. 6 illustrates that in some embodiments the video player control bar within the controller app 109 may be hidden from display either on an automated timer or via a gesture applied to a hide control bar icon with the video 102 then playing in full-screen with current subtitles displayed as target language subtitles 601 or native language subtitles 613. FIG. 6 also shows an example of a subtitle in English for a video originally produced in English, therefore the subtitle in the example is a target language subtitle 601.

Figure 7:
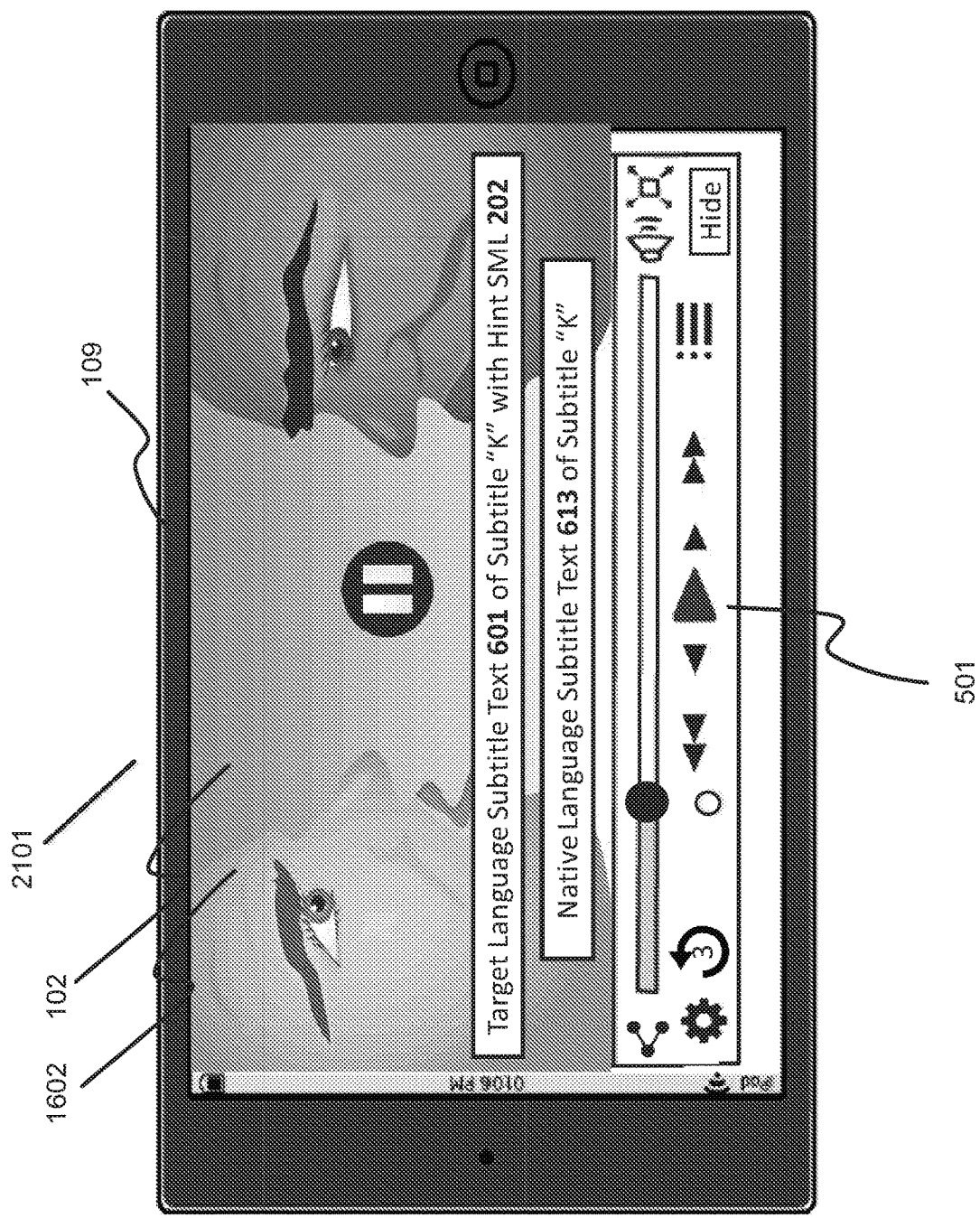
FIG. 7 illustrates a paused video overlaid with a target language subtitle and its native language translation, according to some examples.

FIG. 7 illustrates a paused video mode 2101, which may be activated on video pause. The paused video mode 2101 of FIG. 7 may extend learning information presented by translating the meaning of a specific subtitle into the user's native language and by providing an overlay to the paused video 102 such that the user is able to read the translation at their own pace and leisure. The video 102 may be paused by applying a gesture and/or verbal command to the modal play/pause icon 501, by applying a gesture to the video display area 1602, by a mapped key such as the spacebar, and/or any suitable manner of indicating a pause request. While remaining in full-screen player mode, the controller app 109 may automatically overlay the paused video 102 with the text of the target language subtitle 601 that was being displayed in the streaming video 102 at the moment the video was paused and the text of the corresponding native language subtitle 613. If the video is paused between subtitles (e.g. no subtitle was visible at the time of pause), then the overlaid data may be the most recent target language subtitle 601 text (and its Hint SML, if enabled) and the corresponding native language subtitle 613 translation text. If streaming subtitle display is OFF, the paused-video-mode method may still retrieve and display the current or most recent target language subtitle 601 corresponding to the paused time point, along with the native language subtitle 613 translation text. Hint SML display may be turned on or off via player configuration options 610.

If Hint SML display is ON then the target language subtitle text is rendered with Hint SML, where Hint SML is a visual linguistic encoding method that signals the presence and significance of discrete lexical units within target language subtitles 601. The visual indicators corresponding to the Hint SML may map to specific lexical element types (e.g. nouns, phrases, slang) and may be defined in a glossary within the controller app 109. The visual indicators may include characters, symbols, text formatting, text styling, font type (e.g. Arial, Times Roman), font color, font size, font case, font styling (e.g. strikethrough), underlining, italics, font weight (e.g. bold), and/or special characters. As an example, Hint SML visual indicators may include italics for phrases and idioms (e.g. a bird in the hand is worth two in the bush), strikethrough styling for words best ignored due to vulgarity, "*" symbol for words often appearing in standardized language tests such as TOEFL®, parts of speech abbreviations e.g. "(n)" for nouns, "(v)" for verb, and "(j)" for adjective, square brackets around important sentence structures e.g. [not only] . . . [but also], red font color to indicate slang, and green font for "words you already know" (WYAK i.e. since they have similar sound and meaning to the user's native language e.g. double in English is dabaru in Japanese and has the same meaning in both languages, thus accelerating the user's vocabulary since she already knows the word).

FIG. 8 shows two illustrative examples of Hint SML for target language subtitle 601 (in the examples the original language of the video is English). In Example 1. "John" is marked as a proper noun via (pn): "resembled" in underline font style denotes a verb, and the * indicates a word commonly found in the TOEFL® exam; "a deer in the headlights" in italic styling signals an idiom (i.e. phrase); the word "presentation" is marked in green font to denote a "word you already know" (WYAK) since in this example, the user's native language is Japanese and the word for "presentation" in Japanese (pronounced: purezentayshon) is similar in sound and meaning to "presentation" in English (the target language in this example). In the example shown: verbs are signaled by underline font style, common sentence patterns are indicated by curly brackets, strikethrough style denotes slang or words best ignored, and adjectives are marked by (j). The specific styling, markings and symbols are illustrative and may be optimized for user experience; for example, it may be determined that a red font for slang words provides more effective signaling than a strikethrough font. Hint SML may enable the user to visually identify discrete learning opportunities within target language subtitles 601 while streaming video 102, and while video 102 is paused.

Figure 9:
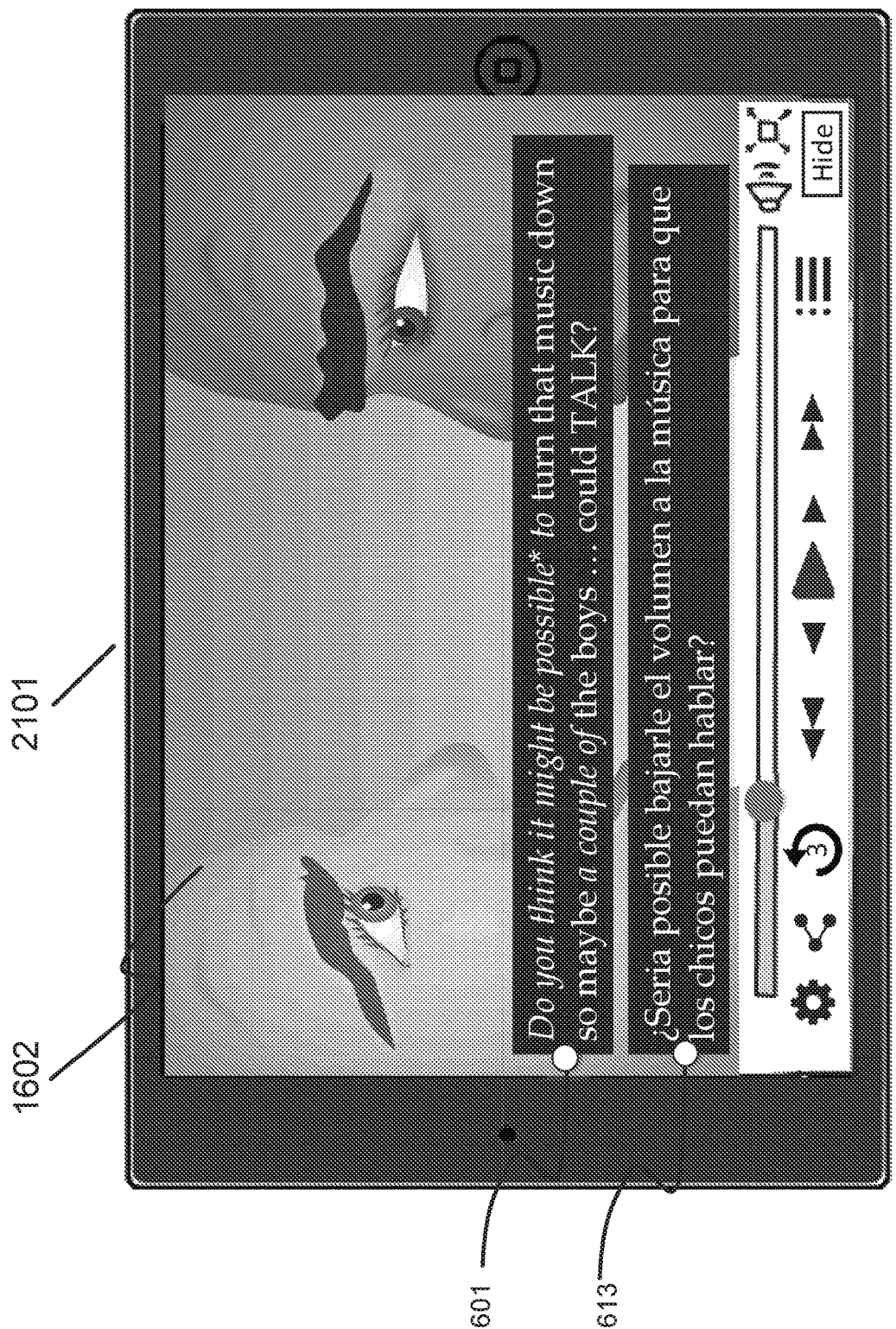
FIG. 9 provides an illustrative example of paused video mode.

FIG. 9 is another example of paused video mode 2101. The system automatically overlays the video 102 with the target language subtitle 601 (e.g. the top most subtitle above for an English language TV show), its Hint SML, and its corresponding native language translation subtitle 613 (e.g. Spanish language subtitle for a Spanish user learning English) for the currently paused video frame. The background image of two men in FIG. 9 illustrates a static image for the current video time point. With the video 102 paused, the video display area 1602 shows an English language target language subtitle 601 with Hint SML, namely "Do you think it might be possible" is italicized because it is a phrase hence the italics styling is a hint. FIG. 9 also illustrates Hint SML examples where "*" is attached to indicate a common TEOFL® word (e.g. possible). "TALK" in upper case signals the main idea of the subtitle, and red font color for "the boys" indicates slang usage. The Spanish translation of the target language subtitle is a native language subtitle 613. Continuing the video streaming reverts streaming subtitles back to subtitle mode, i.e. a single language subtitle is displayed based on the language selected in player configuration options 610.

Figure 10:
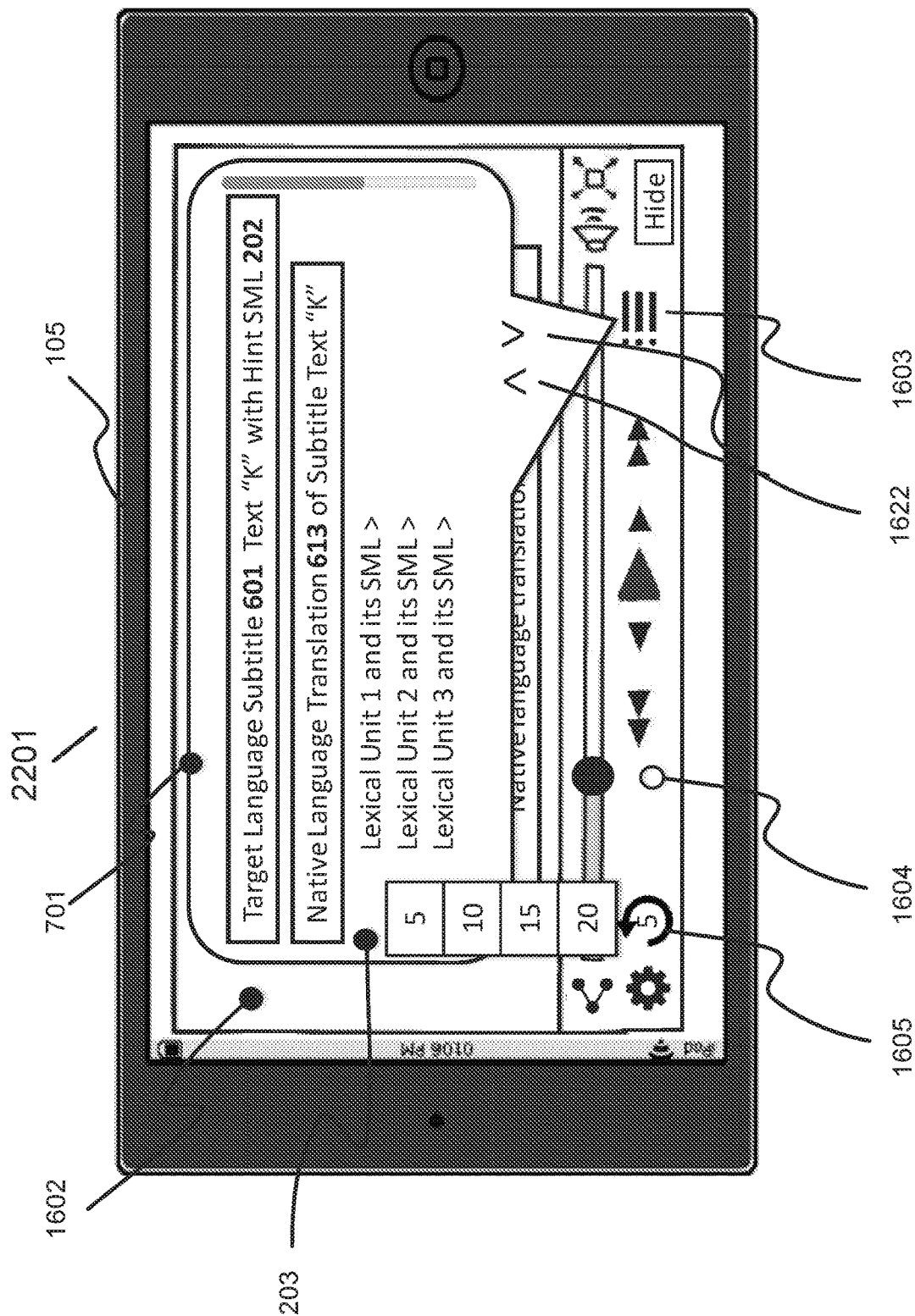
FIG. 10 illustrates a controller app in in-depth mode and inputs for user-configurable auto-continuous video looping, according to some examples.

FIG. 10 illustrates an interface associated with in-depth mode 2201, a mode in which the system may render the pedagogical and usage information for each individual lexical element within the paused target language subtitle 601. In-depth mode 2201 may be activated after pausing the video by applying a gesture to a show all SML icon 1603. A scrollable pop up window 701 may display all SML 203 for a specific target language subtitle 601. SML (subtitle markup language) 203 may enable comprehensive contextual understanding and practical utilization of individual lexical units of target language subtitles 601. SML 203 linguistic information (e.g. examples sentences, disambiguated definition, usage notes) may be presented bilingually (e.g. in target and native languages) within scrollable popover window 701.

SML 203 may be comprised of a target language subtitle 601, its Hint SML, a corresponding native language subtitle 613 (which is a translation into the user's native language of the target language subtitle 601), and other language information. For example, SML 203 may comprise subtitle text, subtitle start time, subtitle end time, unique identifiers for individual subtitles and/or other relational database keys associating subtitles to unique video-ids and to separately identified and displayable lexical units of the target language subtitle 601 (e.g. lexical units such as a phrases and individual words that make up the target language subtitle 601), comprehensive contextual pedagogical information for each lexical unit in the target language subtitle 601 (said pedagogical information may be comprised of the as-uttered disambiguated meaning within a specific target language subtitle 601), parts of speech identification (e.g. common nouns, adjectives, verbs, verb phrases, adverbs, proper nouns), idioms, phrases, clauses, metaphors, similes, pronunciation key, verb conjugations, slang indication, sarcasm indication, humor indication, vulgarity indication, correction indication (e.g. correction to standard spoken form in the case where the as uttered subtitle 601 uses incorrect syntax or grammar), usage notes, words or phrases best ignored by students based on the judgment of the administrative users (e.g. content editors), usage formality levels (e.g. the lexical unit is used only among friends and not to superiors), graphical formality indicator 209 indicating appropriate communication recipient for the lexical unit (e.g. down arrow if lexical unit is only used towards subordinates, up arrow if only used towards superiors, left-right arrow if only used among friends and colleagues, all arrows if appropriate to use in any situation, or any combination of directional arrows (e.g. appropriate usage with friends and subordinates would be left-right arrows and the down arrow), priority signifying the relative value in learning that word or phrase vis-à-vis all other words and phrases found in the target language subtitle 601, priority expressed as a numerical priority value e.g. 1 being top learning priority, 2 being high priority, 3 being lower priority, and 4 being low learning priority, and such priority defined by a computational binning algorithm based on usage frequency in relevant corpora), word-sense disambiguation i.e. the specific meaning of a word or phrase as used in the subtitle 601, example sentences using the lexical units (words and phrases) of the subtitles 601 in the same context as the subtitle 601 utterance, translations of the contextual pedagogical information from the target language into the user's native language, digital audio pronunciation files of the lexical units within the subtitle, digital audio files for the example sentences that further elucidate contextual meaning and pronunciation, emphasis, as identified by font, font case or other text styling (e.g. uppercase font representing the main emphasis or idea of a subtitle 601), words that are identified as similar in both the target language and in the user's native language (collectively, "words you already know", or "WYAK", e.g. trajectory and traectoria—the Russian equivalent word for the English word trajectory), common sentence pattern identification (e.g. not only . . . , but also . . . ), "phrasal formulas" enabling users to see the replaceable variable text within a phrase that can be substituted such that a single formula represents potentially hundreds of unique phrases thus accelerating learning (for example it's a great Sth where Sth is a noun or gerund, thereby accelerating student learning via simple substitution e.g. it's a great day, it's a great walking stick, it's a great idea), and/or any combination thereof.

FIG. 10 illustrates a transition from paused mode to in-depth mode. When a gesture is applied to the show all icon 1603, SML 203 that was retrieved on pause from the cloud backend 100 for the most recent subtitle (but not displayed in paused mode) may be rendered and displayed in the same scrollable pop up 701 thereby replacing paused mode data on the display and entering in-depth mode 2201 where individual lexical units and their SML 203 are displayed in the scrollable pop up 701. Paused-mode may have all data required for in-depth mode in controller device 105 memory, but for clarity via incremental discovery and consumption, paused mode may limit the display to target language subtitle 601 and its native language translation 603 while in-depth mode 2201 may add additional information from the REST API 117 response received on pause, which includes lexical elements and associated SML 203 for each lexical element for the most recent subtitle.

It's well known that human reflexes are not perfect, so it's often difficult to pause a video stream at an exact time point of interest with respect to subtitles. According to some aspects, on entering pause the system may retrieve a most recent subtitle in either paused mode and/or in-depth mode. A most recent subtitle may be identified in the cloud backend 100 by generating a query parameter for a subtitle start time that is less than the time returned by a player API method. For example, an API method used may get a current time and be sent as a GET request (along with the unique video id) to a REST API endpoint 117. Cloud backend 100 business logic may perform a select with a less than current time constraint and where unique video id=current video id and a Limit 1 constraint, to arrive at the unique identifier of most recent subtitle and with the unique subtitle identifier, query and retrieve associated SML 203 data for the paused time point. Further, it may be advantageous to augment the response data by further queries for adjacent (previous and next unique subtitle identifiers) and to include those identifiers in the response to the on pause GET request, thereby preparing by prefetching for the possibility that the user may desire to navigate to a previous or a next subtitle. Those of ordinary skill in the art will recognize that the GET requests for the various learning modes may be split into separate requests or combined as described, with little impact on system performance.

Additionally and/or alternatively, the system may support navigation through subtitles during paused mode and/or in-depth mode. As illustrated in FIG. 10, player controls may enable the user to request the next or previous subtitles and associated SML 203 without leaving the scrollable pop-over window 701 and without restarting the paused video 102. This may provide users with the ability to display SML 203 for the next or previous subtitle by applying a gesture to a next or previous icon 1622 within the scrollable pop-over window 701 thereby stepping thru SML 203 forward or backwards one subtitle at a time while the video is paused. Such traversal method starts from paused mode and/or in-depth mode with the user applying a gesture to the next or previous icon 1622. A GET request to a REST API endpoint for next or previous may be formed by sending search parameters in the request comprised of the unique subtitle identifier for the previous or next subtitle wherein these identifiers may be pre-fetched on pause. Cloud backend 100 business logic may perform a first check if a next or previous subtitle exists. A data set for the currently selected next or previous subtitle comprised of a native subtitle 601, its translation, its Hint SML, and its SML 203 may be retrieved, formatted and transmitted over the Internet 101 to the controller device 105 and displayed in the scrollable pop-over window 701. The previous/next subtitle may be retrieved and displayed without playing the video 102 or video segment 802, and without moving the video player head. Prior to transmitting the data set for the currently desired previous or next subtitle, the method may augment the data set by pre-fetching a further previous or next unique subtitle identifier and may include that information with the SML returned to the controller app 109. Pre-fetching a previous or next unique subtitle identifier with respect to the currently selected previous or next subtitle may be determined by querying for a subtitle (and its unique subtitle identifier) having a subtitle start time that is less than the start time of the currently selected previous subtitle (if previous) or greater than the start time of the currently selected next subtitle (if next) and where video id=current video id and a Limit 1 constraint, to arrive at the pre-fetched next or previous unique subtitle identifier.

The process of stepping forward or backward may continue as desired by the user until the user is finished studying SML 203. Selecting anywhere outside of the scrollable pop-over window 701 may dismiss the scrollable window 701 and the user may then continue playing the video 102 by selecting the play/pause button 501. The play/pause function may also be implemented by applying a gesture anywhere on video 102 display area.

Figure 15:
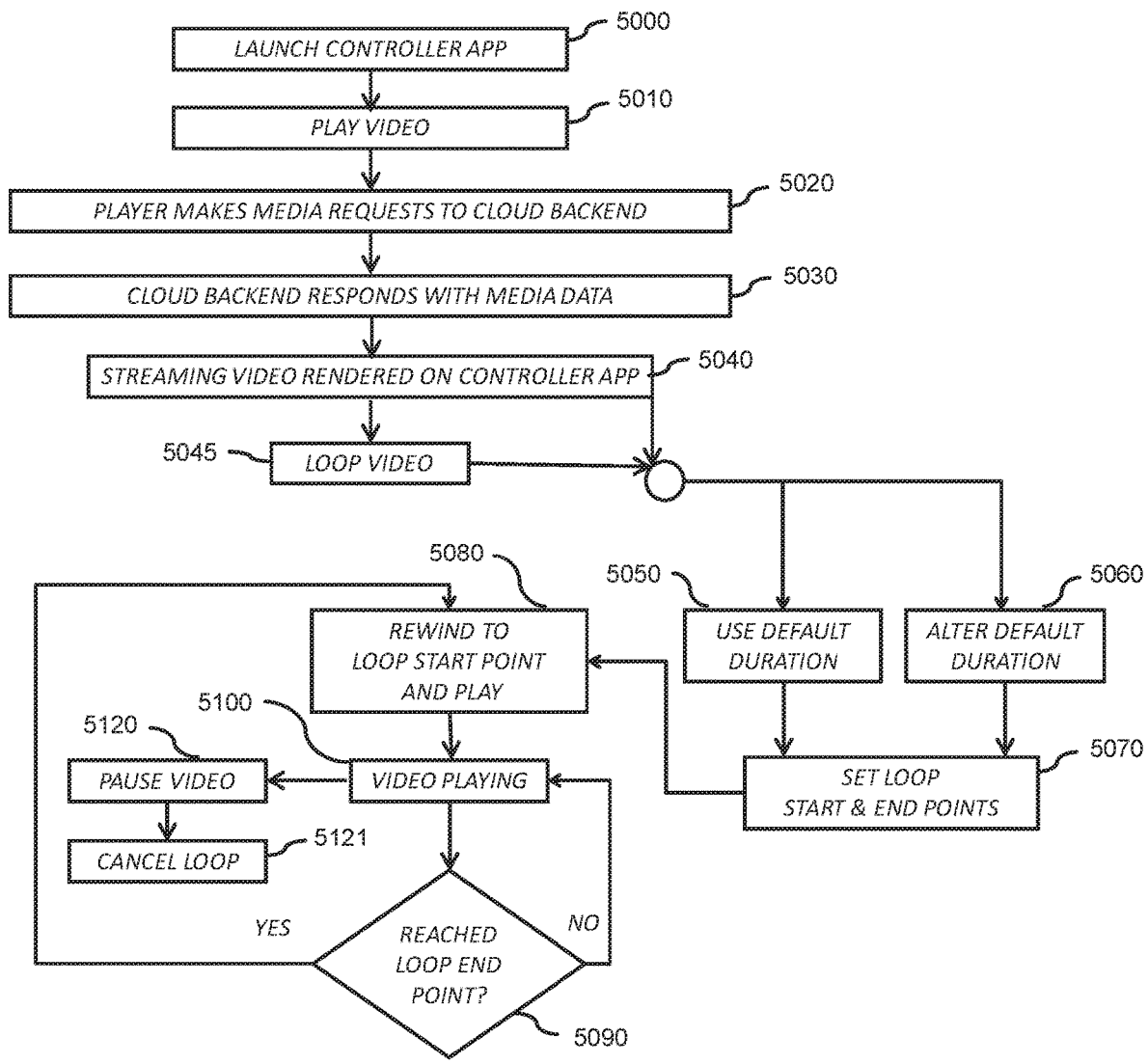
FIG. 15 illustrates an example method for user-configurable video looping.

FIG. 10 and FIG. 15 illustrate a method in an embodiment for auto-continuous, user-configurable video looping. The loop icon 1605 shown in FIG. 10 may display a default loop duration parameter (in seconds). The loop icon 1605 may be implemented such that if the icon is clicked or touched, auto-continuous looping begins, and the loop duration may be equal to the default duration displayed in the loop icon 1605. The end time point of the auto-continuous loop may be the time at which the loop icon 1605 was gestured (e.g. touched) plus ½ of the default loop duration. The start time point of the loop may be the time point at which the loop icon 1605 was gestured minus A of the default loop duration. If a non-default loop duration is desired, the user may select a non-default duration parameter from a pop-up associated with the looping icon as illustrated in FIG. 10. In the case of a non-default duration, the end time point of the loop may be calculated based on the time point at which a duration was selected plus A of the chosen duration, and the start time point of the loop is calculated based on the time at which a duration was selected minus ½ of the chosen duration. In other embodiments, the loop start and end times may be determined surrounding the current time in proportions other than half of the specified loop time. For example, the loop may be configured to start at a point before the current time by the full amount of the loop duration, and the loop may end at the current time. The video segment may be continuously looped until the user interrupts the auto-continuous loop by selecting any function within the controller app 109. It should be noted that the duration parameter pop up associated with the loop icon 1605 may be accessed by hovering over the loop icon 1605 in a browser based application, or by press-and-hold within a native mobile application, in some implementations.

Figure 11:
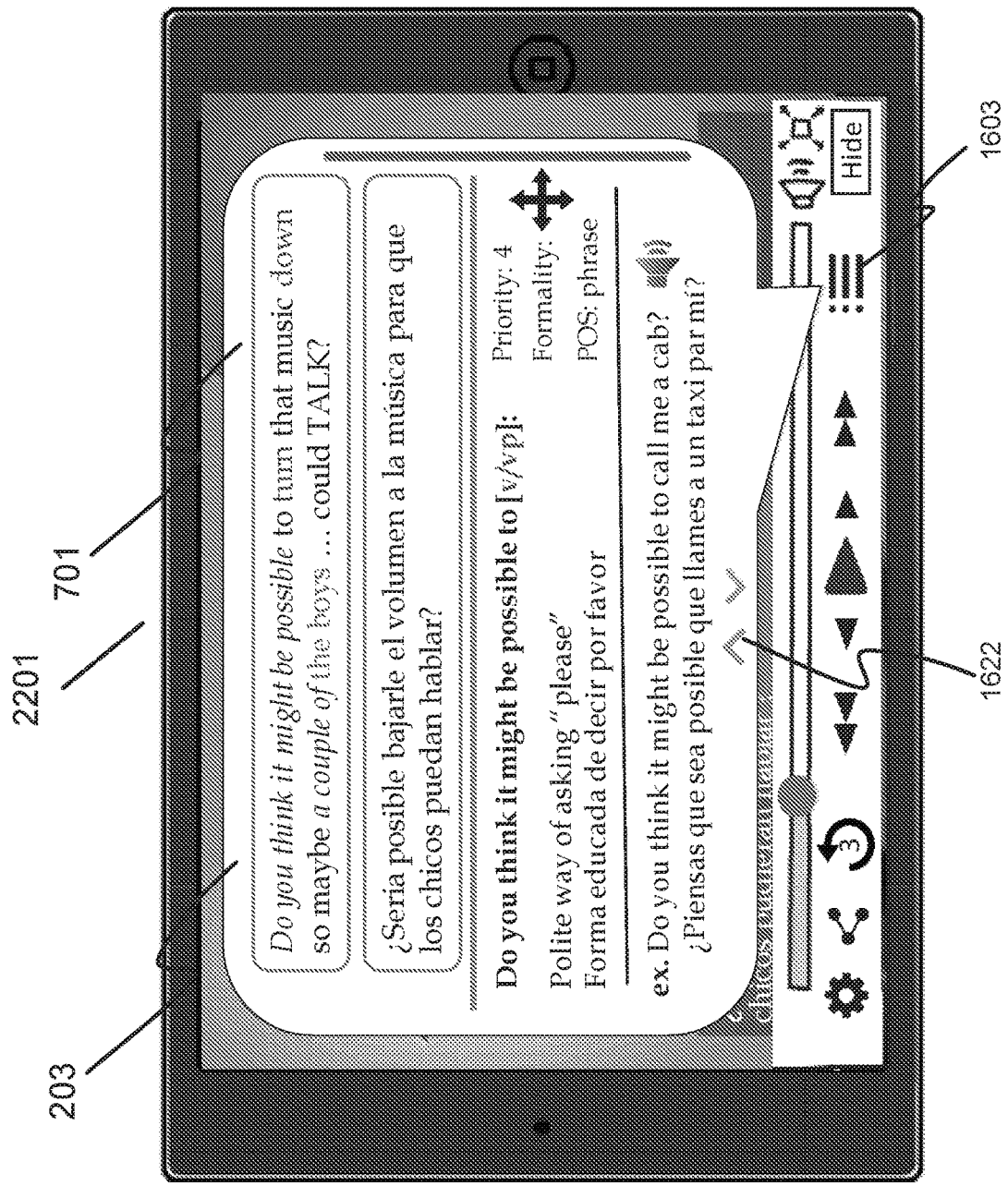
FIG. 11 provides an illustrative example of in-depth mode for a paused video time point.

FIG. 11 is an illustrative example of in-depth mode 2201 and shows SML 203 for a paused video time point. The scrollable window 701 may enable the user to scroll down to see all lexical elements of the target language subtitle 601 "Do you think it might be possible to turn that music down so maybe a couple of the boys . . . could talk?" The definition of each lexical element may be presented in the context of the uttered subtitle e.g. a disambiguated meaning, which may facilitate accelerated learning.

Figure 12:
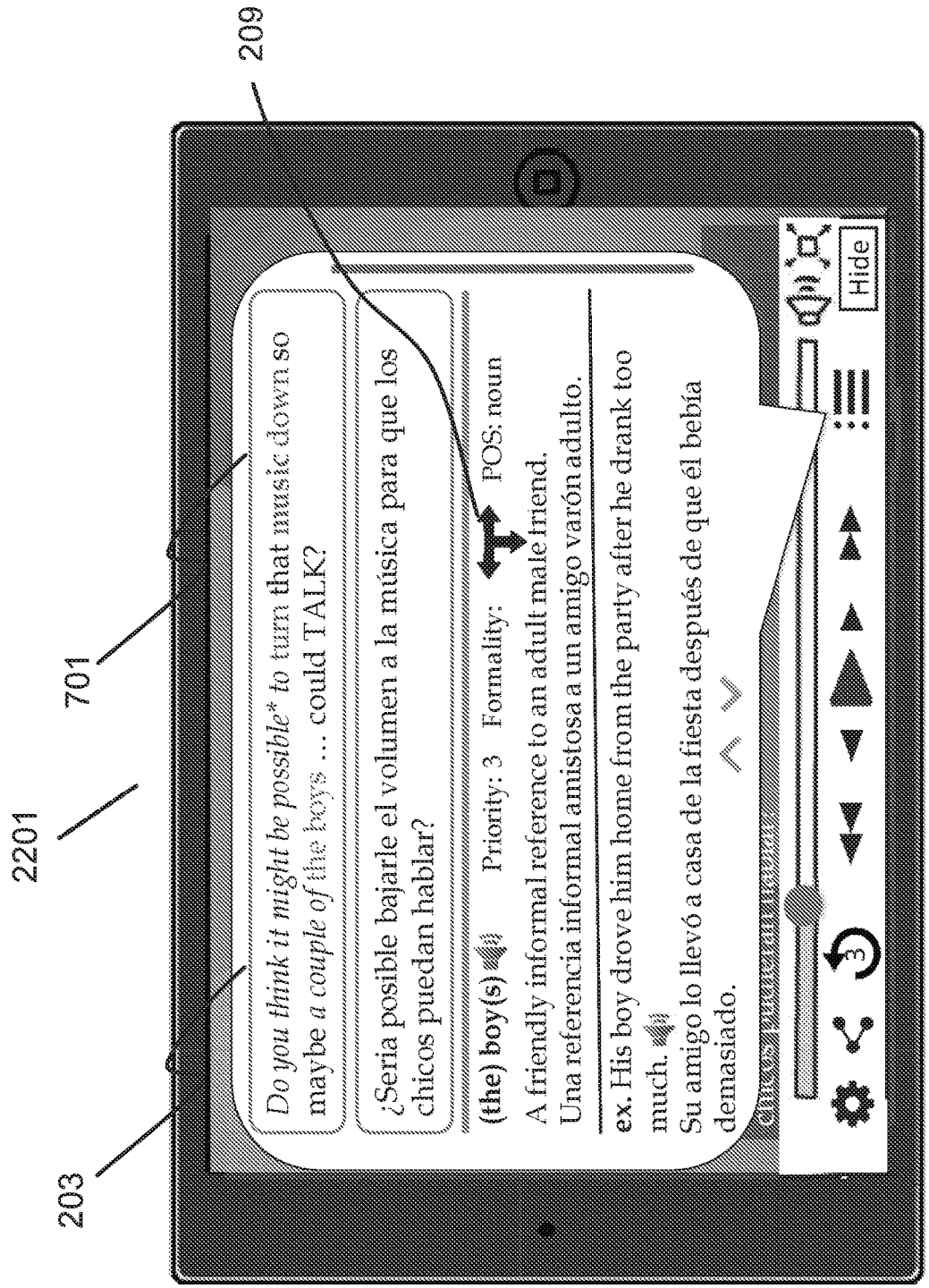
FIG. 12 provides an illustrative example of in-depth mode for a paused video time point.

FIG. 12 is an illustrative example of in-depth mode 2201 for the same time point as FIG. 11 but with the scrollable window 701 positioned to see another SML lexical element "the boys". A graphical formality indicator 209 in the example indicates that this lexical element is used with friends, colleagues and subordinates but not with superiors (e.g., no up arrow).

Figure 13:
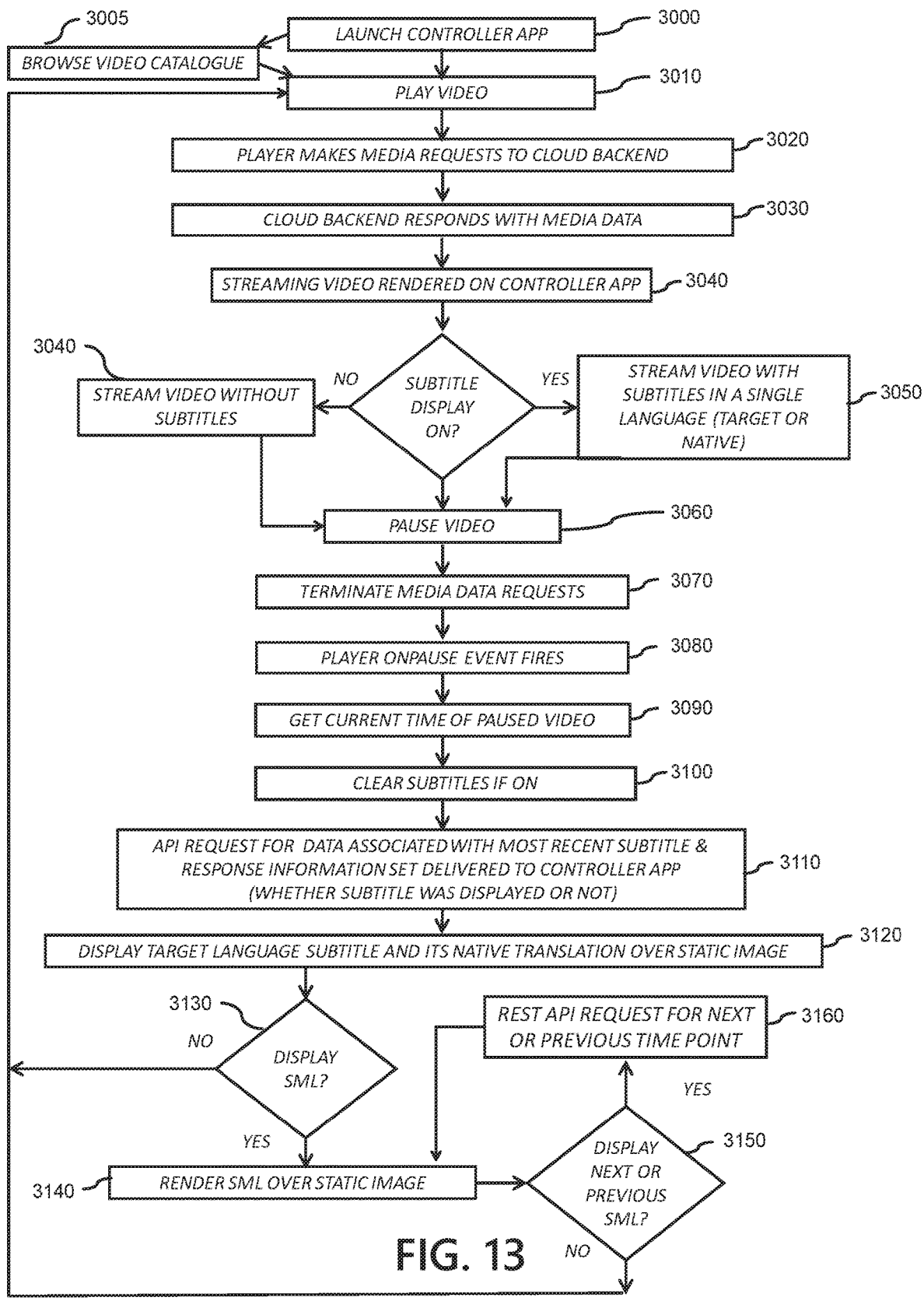
FIG. 13 provides an example flow diagram of user interaction with the system.

FIG. 13 is an illustrative schematic of an embodiment for a hierarchy of video-based learning modes. In step 3000 the controller app is launched on the controller device 105; in step 3005 a video catalogue 302 is retrieved from the cloud backend 100 and displayed in the controller app 109. In step 3010, a gesture may be applied to a thumbnail of a desired video thereby causing the video to be played. In step 3020 the video player running in the controller app 109 may make media data requests to the cloud backend, and in step 3030 the cloud backend origin servers 114 or CDN servers may respond with media data (e.g. a byte range for a streaming video). In step 3040 the streaming video 102 (or video segment 802) may be rendered in the controller app 109 without subtitles. In an embodiment, the video may be displayed in full-screen for optimal user experience. In step 3050, when the option to display subtitles is selected via a gesture or command (e.g. subtitle display ON within player configuration options 610), subtitles may be displayed over the streaming video in a single language (target or native language); in step 3070, when a command (e.g. voice) or gesture is applied to the controller app 109 the video may be paused with the player remaining in full-screen mode, at which point in step 3080, the video player running in the controller app 109 may terminate media data requests and an onPause player event may fire at which point in step 3090, a callback may execute a video player API GetCurrentTime method that returns the current time point of the paused video to a controller app 109 callback; in step 3100, subtitles that may have been streaming may be cleared from the screen. In step 3110, the current time of the paused video 102 (in millisecond accuracy) and a unique video id for the streaming video 102, may be passed as parameters of a GET request sent from the controller app 109 to a REST endpoint 117 in the cloud backend 100 where business logic servers query a SQL database or structured cache and generate an information data set associated with the most recent subtitle of the video stream 102 (or video segment 802), whether that subtitle was displayed or not (i.e. whether subtitle display was ON or OFF), and sends to the controller app 109 an information data set (which may be JSON formatted), comprising the target language subtitle 601, its native language translation 613, its Hint SML 202, its SML 203, and/or the start time of the target language subtitle 601. This method may resolve a potential problem that it may be highly likely that the user may pause the video 102 between two subtitles i.e. when there is no visible subtitle on pause. In step 3120 a subset of the information data set delivered in step 3110 may be rendered over the paused video screen, the subset rendered in step 3110 may include a single target language subtitle 601, its native language translation 613, and/or its associated Hint SML 202, such as if a Hint SML display option is ON within player configuration options 610. In step 3130, an option may then be presented to display further information; the further information comprised of corresponding SML 203 for the paused time point; such SML 203 may have already been delivered to the controller app in step 3110 but may not have been displayed in its entirety. In step 3140 upon a gesture on a "Show All SML" icon 1603, all SML for the time point may be rendered over the paused video static image. In step 3150, next or previous time point SML 203 may be retrieved and displayed by applying a gesture to icons 1622 whereby the display is updated for the SML 203 related to the next or previous time point (as further described in FIG. 10). It should be noted that it may not be necessary to play the video to move to the next or previous time point SML 203, and retrieval and display may continue until it is desired to continue playing the video 102. Returning to step 3010, a gesture may be applied to the static screen of the paused video or to a model play/pause 501 button, thereby continuing to play the video stream from the point that it was paused.

Figure 14:
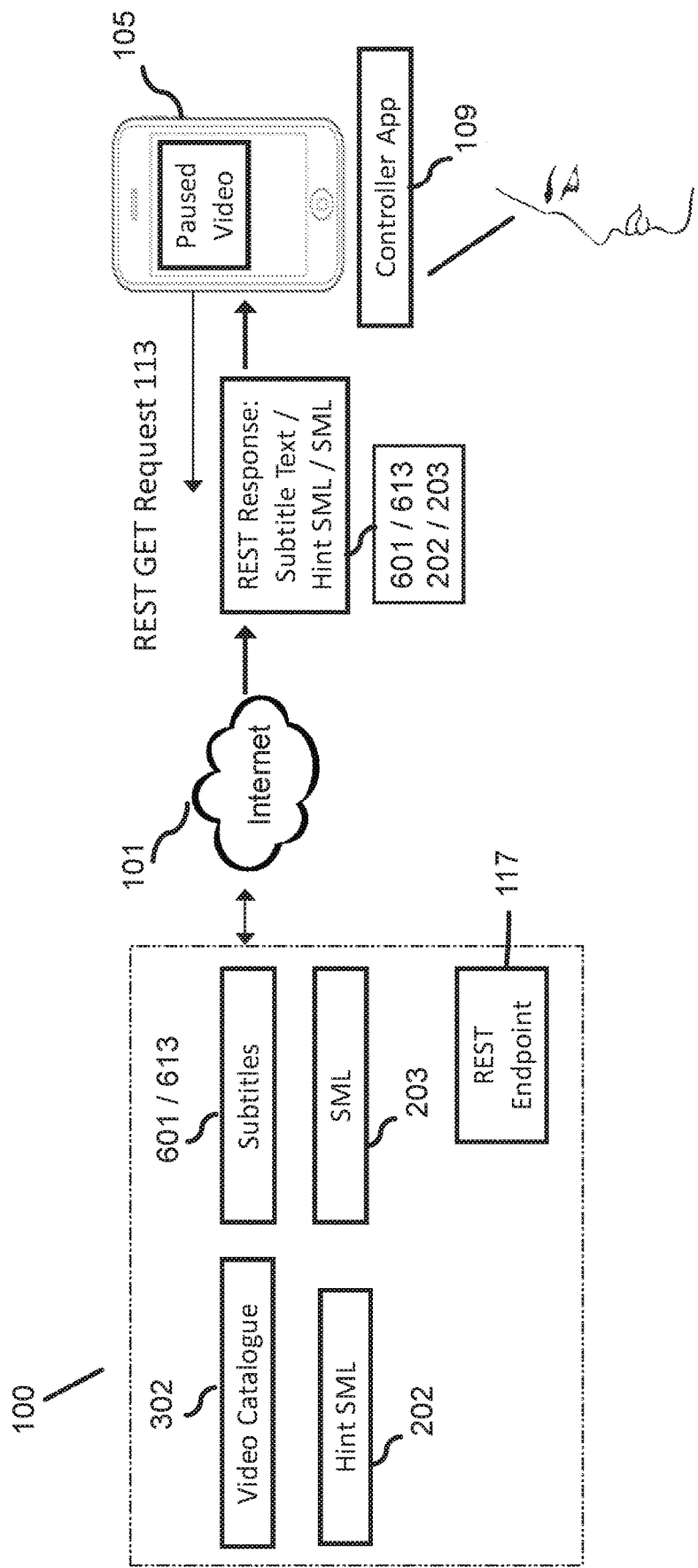
FIG. 14 illustrates an example data request to the cloud backend on pause.

FIG. 14 provides a schematic illustrating a controller app 109 making a data request to the cloud backend 100 REST endpoint 117 on video pause. The response data may include subtitle data 601/613, Hint SML 202, and SML 203. A video catalogue 302 and related subtitle 601/613 and SML 203 data may be stored relationally such that REST endpoints 117 may accept requests for information and respond in an efficient and scalable manner.

FIG. 15 provides a schematic illustrating a method in an embodiment for auto-continuous, user-configurable video looping. In step 5000 the controller app is launched on the controller device 105. In step 5010, a gesture may be applied to a thumbnail of a desired video thereby playing the video 102, in step 5020 the player may make a media request to the cloud backend 114, and in step 5030 the cloud backend origin servers 114 or CDN servers respond with media data (e.g. a byte range for a streaming video). In step 5040 the streaming video may be rendered in the controller app 109, and in step 5045 a loop gesture may be applied to a loop icon on the video player control bar. In step 5060 the loop icon 1605 may allow either the selection of a loop duration parameter e.g. 10, 15, and 20 seconds (e.g. press and select duration from a pop up associated with the loop icon) or in step 5050 acceptance of a default loop duration parameter (e.g. 5) seconds by selecting the loop icon 1605 without altering the duration, where said duration, whether default or altered, may then displayed as part of the loop icon 1605 while the video is looping. In step 5070, the loop end point may be calculated as the time point in the video 102 at which the default loop duration was selected (or when a non-default loop duration was selected) plus half of the loop duration, and the loop start point may be calculated as the time point in the video 102 at which the default loop duration was selected (or when a non-default loop duration was selected) minus half of the loop duration. In step 5080, the video may be automatically repositioned to the start of the loop and the video plays without any user additional input required. As illustrated in step 5090, a video time check may be made repeatedly in short time intervals (e.g. every 0.5 seconds) while the video is streaming such that if the end point of the loop has not been reached, the video 102 continues to play as illustrated in step 5100. If the end of the loop has been reached in step 5090, then the video may be automatically repositioned to the loop start point and video play may be automatically initiated as illustrated in step 5080. The play-reposition-play cycle may continue until a pause video command is initiated in step 5120 or some other app function in the controller app 109 is initiated thereby canceling the looping in step 5120/5121. Upon looping termination, full-length video 102 may be immediately available for play without needing to load a different URL since auto-continuous user configurable video looping according to some aspects may not generate new video data but rather may be comprised of meta-data references and events that are acted upon by the player 110 with respect to full-length video 102.

Figure 16:
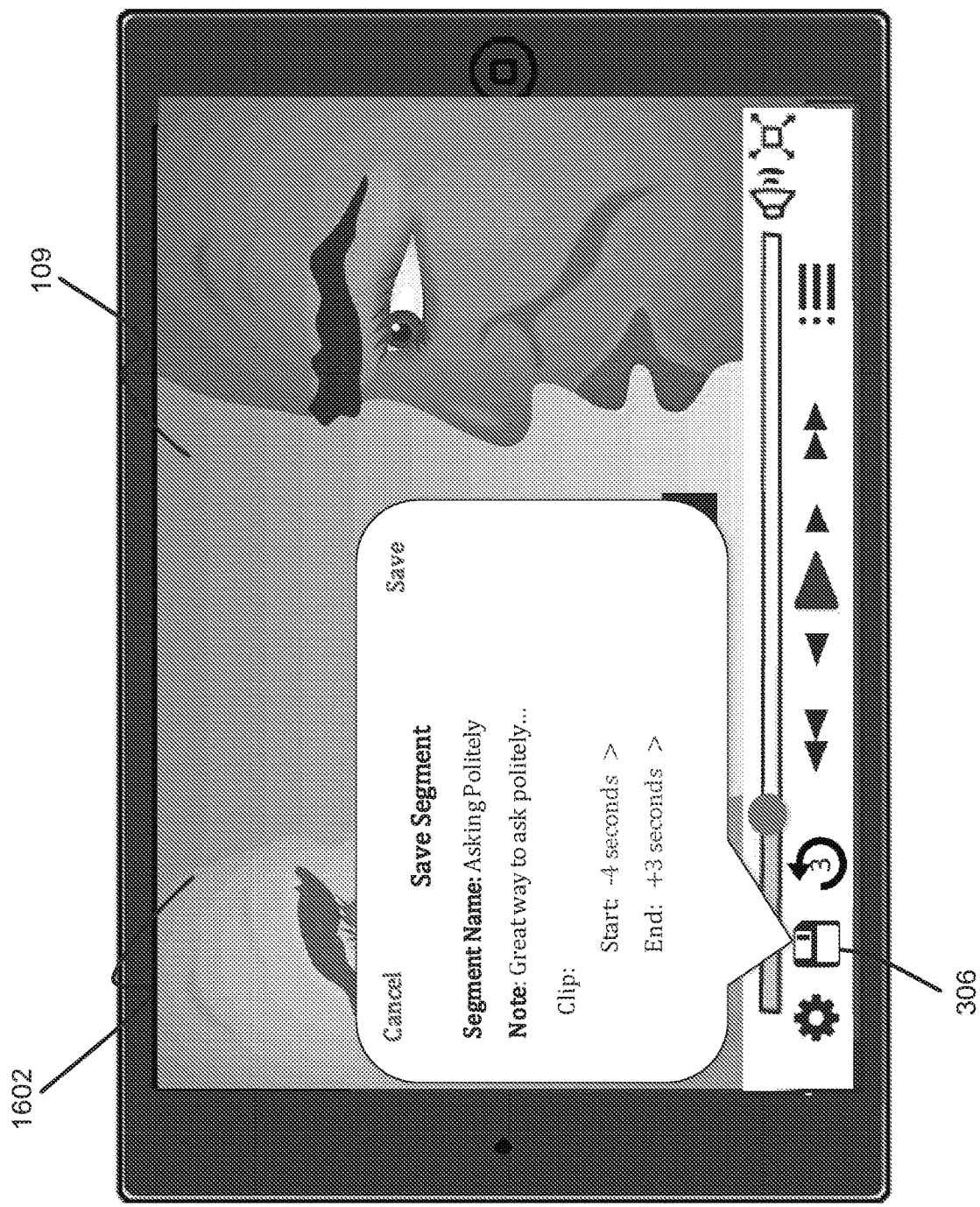
FIG. 16 illustrates an example method for the creation and storage of video segments.

FIG. 16 provides an illustrative user interface in an embodiment of the system wherein the controller app 109 incorporates a save function 306 for the creation and storage of auto-continuous looping video segments (also referred to as "video segments") such video segments include navigable time-point-associated SML (i.e. only a SML within the segment duration), segment name, segment subject, and notes as user generated content. FIG. 16 illustrates the creation of short video segments within the controller app 109. Saving a video segment in an embodiment may begin by pausing the video, and then by applying a gesture to the save segment icon 306 whereupon input parameters are presented for segment start and segment end points relative to the paused video time point, such inputs thereby define the loop duration. Video segments may be storage-efficient and transmission-efficient since they may not create new video data, rather, video segments may create timeframe references and relationships (user-id, video-id, start/end values) to full-length videos having unique video-ids. Video segments may be stored and related to the saving user's unique user-id in the cloud backend database, and upon save 306, the video segments may be immediately visible and displayed in the user's Saved screen 611 shown in FIG. 17. It should be noted that all learning modes: natural, subtitle, paused video, and in-depth, may available for looped video segments (whether saved or shared). When video segments 802 are played, the video may be displayed on the video display area 1602 in the controller app 109. When the endpoint of the video segment is reached, the controller app 109 may automatically reposition (e.g., rewinds) the player head to the start point of the video segment. Such automated looping may continue until the user cancels segment looping by selecting any other application function such as pause video.

Figure 17:
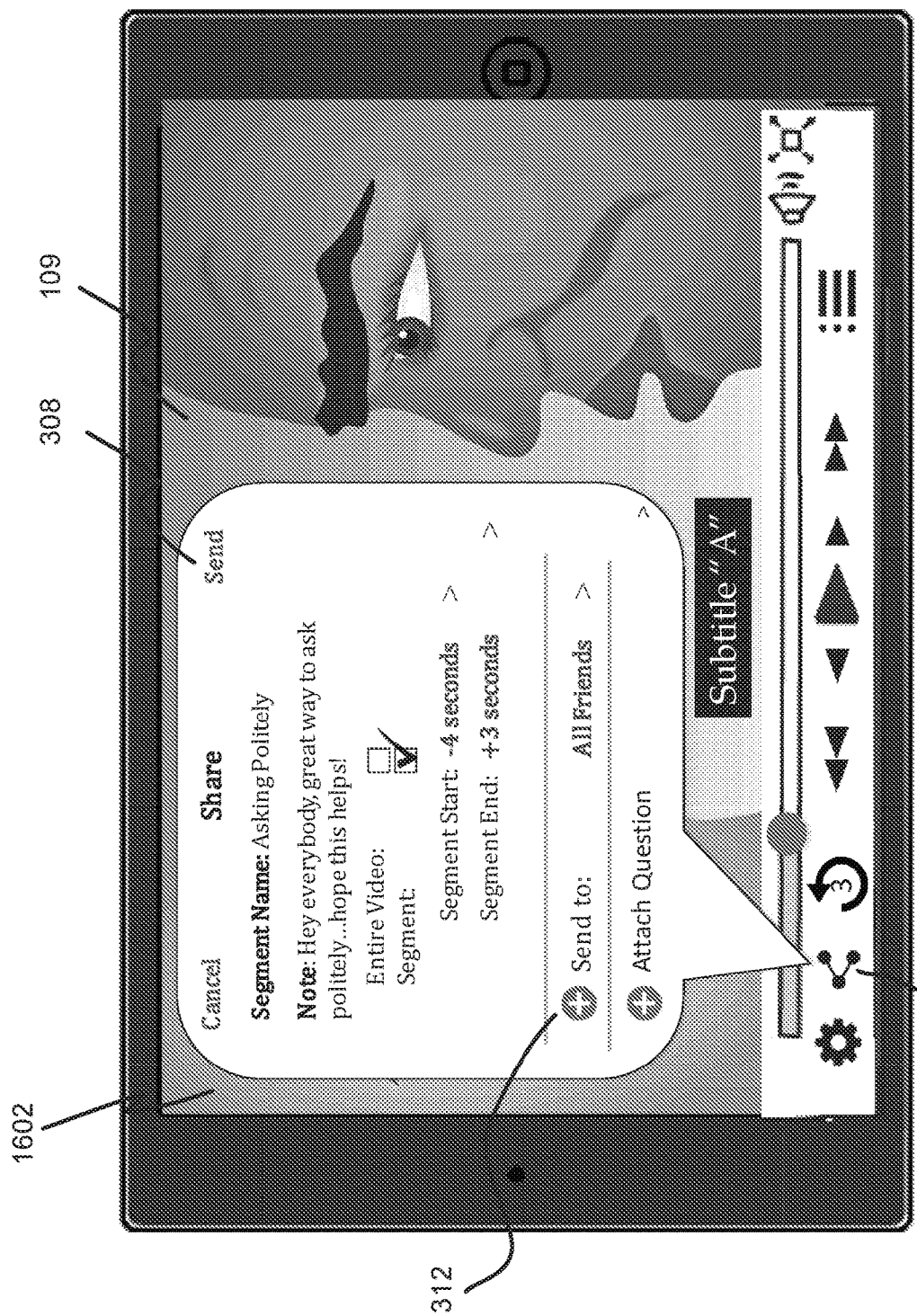
FIG. 17 illustrates an example method for creation, storage, and sharing of loops.
Figure 19:
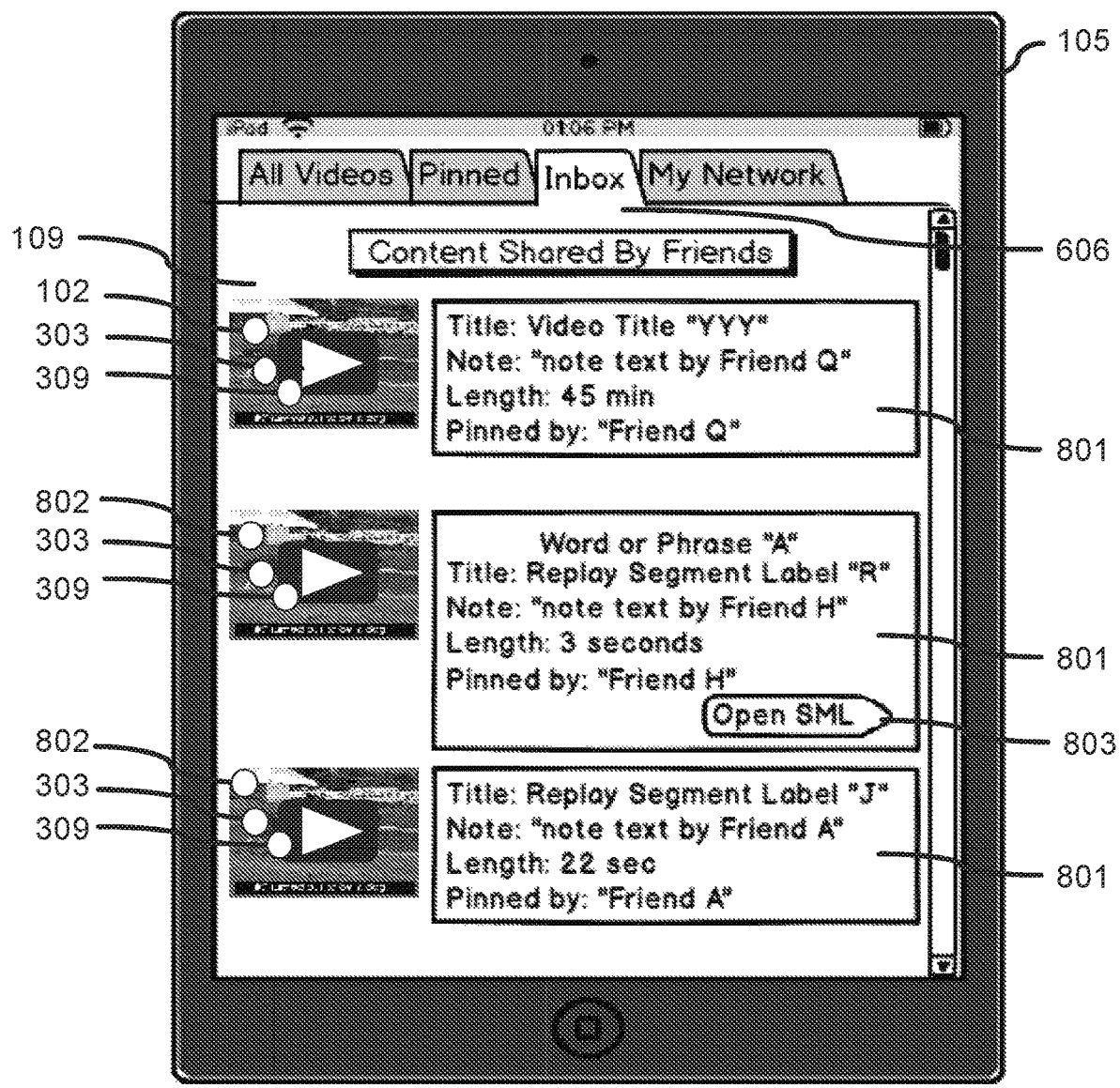
FIG. 19 illustrates an example method for interacting with shared video segments.

FIG. 17 presents an illustrative user interface in an embodiment of the system wherein the controller app 109 incorporates a share function 305 that enables creation, storage, and sharing of auto-continuous looping video segments. The method to create shared video segments may be similar or the same as in saving video segments illustrated in FIG. 16, with the additional capability to choose recipients 312 for the video segments, where such recipients may include friends, students, teachers or groups connected within the system to the sharing user. Users may optionally attach a comprehension questions to a video segment as delineated in FIG. 21. To share a video segment, a user may select a Send to: recipient 312 comprising one or more of: a connected user (i.e. a friend), a named group (e.g. a specific study group or class containing particular student users), or public and upon selecting Send 308, the video segment, along with its metadata may be stored in the cloud backend database and immediately displayed in each recipient's Inbox screen 606 as shown in FIG. 19. If the Send to: recipient is public, then the video segment may be shared publicly on blog-like screens within the controller app 109, on social networks such as Facebook or Twitter, and/or in any other suitable fashion.

Figure 18:
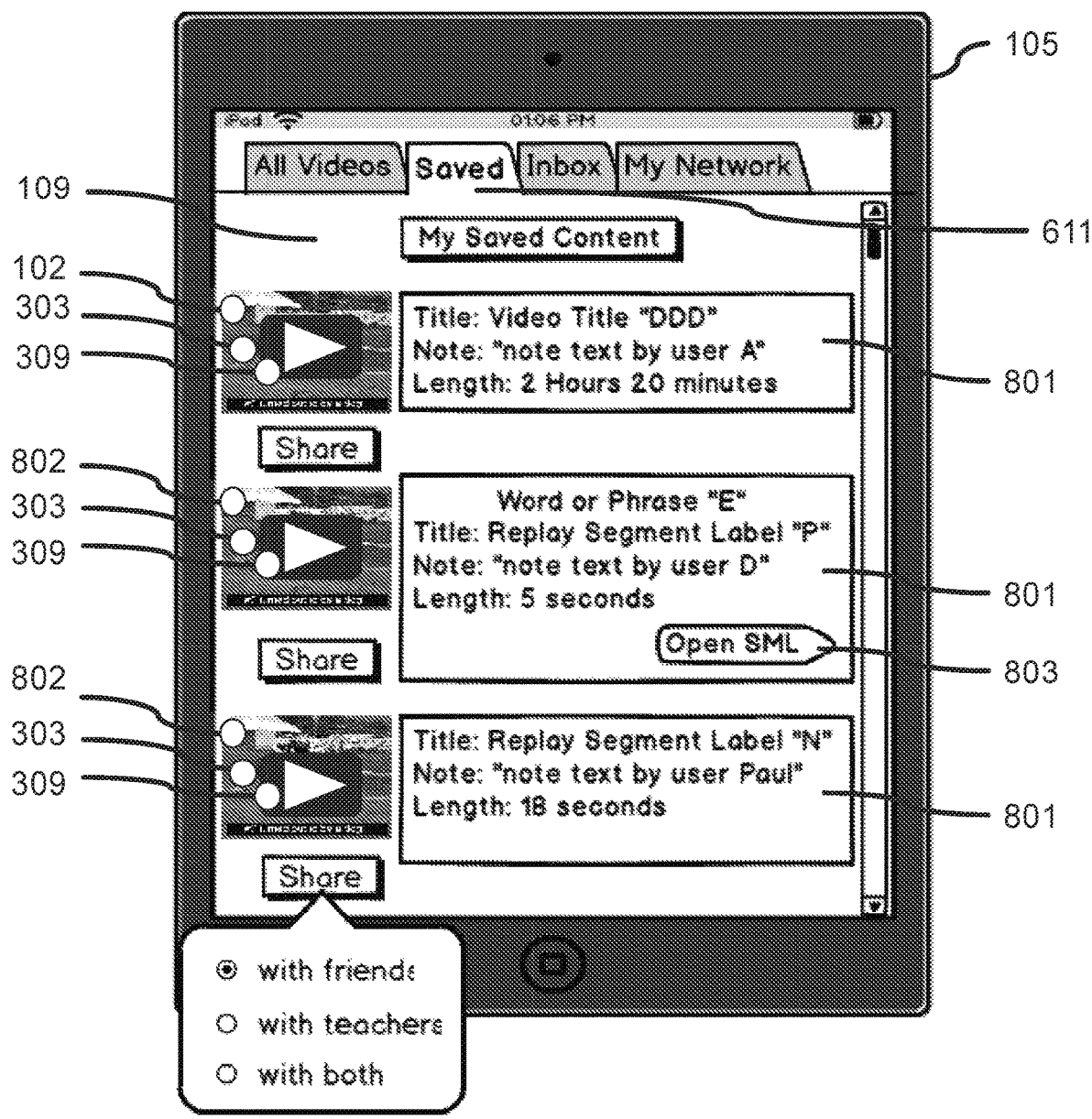
FIG. 18 illustrates an example method for interacting with saved video segments.

FIG. 18 provides an illustrative user interface in an embodiment for interacting with saved video segments 802. Video segments 802 listed on the Saved screen may be searchable via text inputs 801 and may be sortable by date/time. The user's note and subject input 801 on saving the segment may be attached to the video segment. SML 203 data for time points within the video segments 802 may be navigable time point by time point via navigation interface elements 803, without needing to start or play the video segment. To play a video segment 802, a gesture may be applied to the play button 309 overlaid on a video thumbnail 303 (or simply applying a gesture to a video segment thumbnail 303) and the controller app 109 may begin streaming the video by requesting video segments 802 from the cloud backend 100 according to the video segment video metadata, such as URL/URL parameters for the video segment (e.g. Source URL 106, manifest file, video segment start time, and video segment end time). When a user plays a video segment 802, the video player 110 may begin playing the video segment 802 at the segment start point defined when the video segment 802 was created, and at the segment end point defined when the video segment 802 was created, the player head may be automatically returned to the start time point of the video segment 802, and then the player 110 may continue to play the video segment 802 thereby running the video segment 802 in an auto-continuous loop with no user interaction required to continue such looping. At any time, looping may be cancelled by pausing the video or by activating any other function of the controller app 109. If the video segment 802 looping is cancelled by pausing the video, the full-length video 102 may be viewed by selecting the play function 501 of the video player 110.

FIG. 19 provides an illustrative user interface in an embodiment for interacting with shared video segments 802. When a connected friend or teacher shares a video segment 802, a video segment may be listed in the recipients Inbox as illustrated in FIG. 19. The sender's user id, note and subject may be attached to the video segment 802. Shared video segments 802 may be filterable via keyword inputs and are sortable by date/time received. SML 203 data for time points within the video segments is navigable time point by time point, without needing to start or play the video segment 802. To play a shared video segment 802, a gesture may be applied to the play button 309 overlaid on a video thumbnail 303 (or simply applying a gesture to a video segment thumbnail 303) and the controller app 109 may begin streaming the video by requesting video segments from the cloud backend 100 according to the video segment 802 video metadata e.g. URL/URL parameters for the video segment 802 (e.g. Source URL 106, manifest file, video segment start time, and video segment end time). When a user plays a shared video segment 802, the video player 110 may begin playing the video segment 802 at the segment start point defined when the video segment 802 was created (e.g. on share), and at the segment end point defined when the video segment 802 was created, the player head may be automatically returned to the start time point of the video segment 802, and then the player 110 automatically may continue to play the video segment 802 thereby running the video segment 802 in an auto-continuous loop with no user interaction required to continue such looping. At any time, in some implementations, looping may be cancelled by pausing the video or by activating any other function of the controller app 109. If the video segment 802 looping is cancelled by pausing the video, the full-length video 102 may be viewed by selecting the play function 501 of the video player 110.

Figure 20:
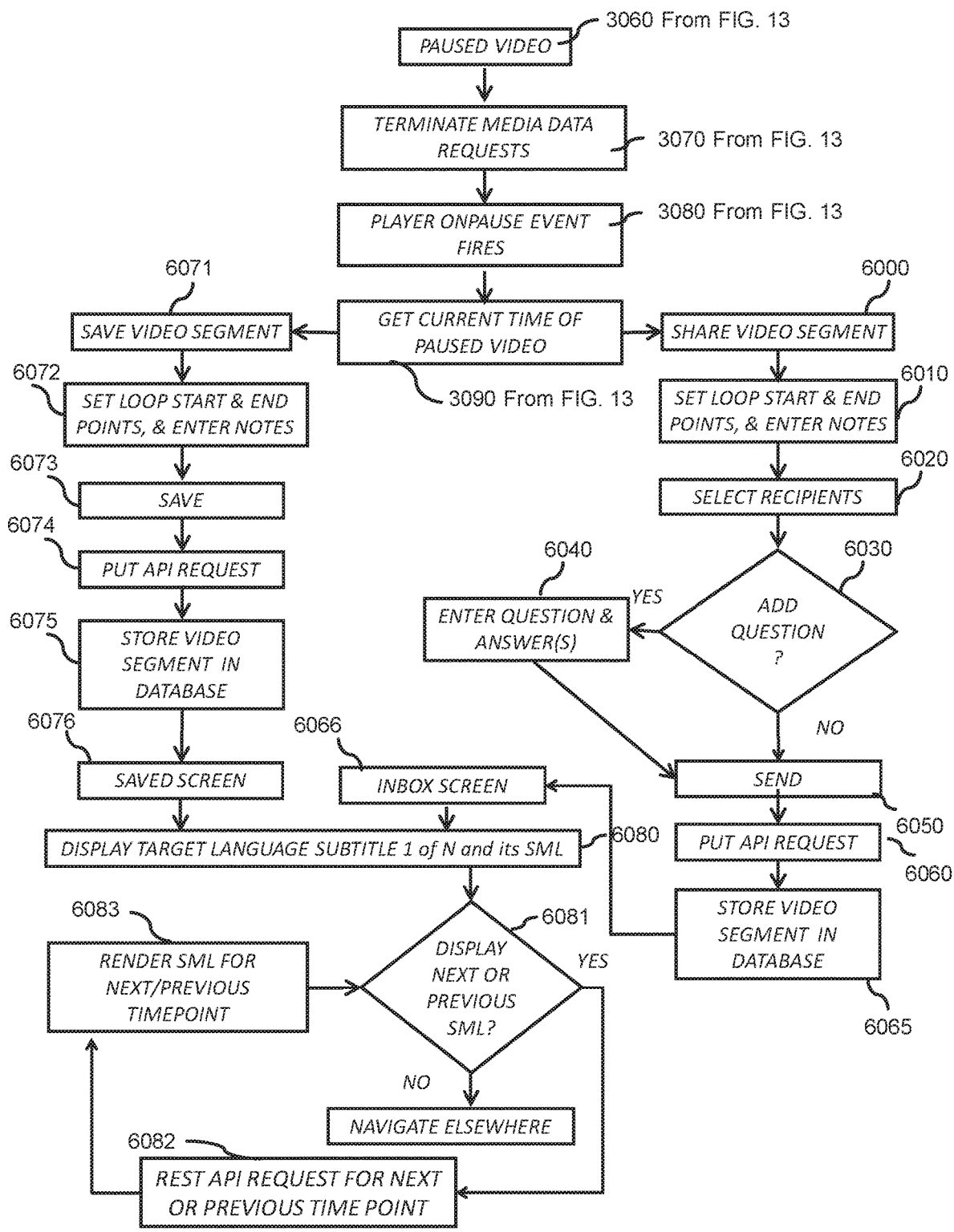
FIG. 20 illustrates an example method to create, save, and share video segments.

FIG. 20 provides a diagram of a method to create, save, share and interact with video segments 802 according to some aspects. In FIG. 20, steps 3060, 3070, and 3080, 3090 may correspond to the same steps as in FIG. 13, which may each occur when a video 102 is paused.

In step 6000 a gesture may be applied to a share icon 305 on the video player control bar 1604 and the user may be presented with a pop-up window with inputs for start and end points of the video segment 802 and for free form text input for a subject and a descriptive note. In step 6010, start and end points may be set by user input relative to the paused point e.g. +5 seconds and −5 seconds thereby creating a segment of 10 second duration with start time=paused time point minus 5 seconds and an end time=to paused time point plus 5 seconds. In step 6020, recipients for the shared video segment 802 may be selected, which may include friends, students, teachers, and named groups of users e.g. a class of specific students. Optionally, in step 6030 a comprehension question may be associated with the video segment 802. If a question is associated, inputs fields may be presented in step 6040 for question text, response choices, correct answer, and difficulty level of the question. In step 6050 a gesture may be applied to a Send button 308 which may generate a PUT REST request constructed from the input data that defines the video segment 802 (e.g. start time, end time, video-id, subject, note, recipients, comprehension question, question difficulty level). At step 6060 the PUT REST may be sent to a REST API endpoint 117 in the cloud backend 100 where business logic servers reside. In step 6065, the system may write the shared segment 802 definition data to the database running in the cloud backend 100. Upon saving to the database, the receiving user may be notified within the controller app 109 of the arrival of new shared content via in-app notification. Such notification may also include push notifications from external to the controller app 109 such as Apple® iOS push notifications. Newly received shared segments 802 may be listed on the Inbox screen in step 6066 and may be text searchable and sortable by date/time of receipt.

FIG. 20 further illustrates an illustrative method to save video segments 802. Since the only recipient of saved video segments is the creator of the video segment, the primary purpose of saved segments may be efficient self-study. In step 6071 a video segment may be created by first applying a gesture to a Save button 306 on the video player control bar 1604. The user may then then be presented with a pop-up window for inputs including a start/end point of the video segment and for free form text for subject and a descriptive note. In step 6072, start and end points may be input relative to the paused point (e.g. +3 seconds and −3 seconds thereby creating a segment of 6 second duration with a start time point equal to the paused time minus 3 seconds and an end time point equal to the paused time plus 3 seconds). In step 6073 a gesture may be applied to Save button 306 which may generate a PUT REST request constructed from the input data that defines the video segment 802 (e.g. start time, end time, video-id, subject, note, creator's user-id) and such PUT REST request 6074 is sent to a REST API endpoint 117 in the cloud backend 100 where business logic servers, in step 6075, write the saved segment 802 definition data to the database running in the cloud backend 100. Newly saved segments 802 may be listed on the Saved screen in step 6076 and may be text searchable on subject, note, and SML 203 within the video segment time range, and may be sortable by date/time of receipt.

FIG. 20 further illustrates an illustrative method to interact with saved and shared video segments 802. In step 6080, SML 203 for the first of N subtitles (i.e. 1 of N) within a video segment 802 (whether saved or shared segments), where N is the number of subtitles within a particular video segment 802, may be displayed in the controller app 109. In step 6081, subsequent subtitle time points within the video segment 802 and associated SML 203 (or previous time points if already on a forward time point within the video segment 802) may be retrieved on-demand individually and delivered in step 6082 from the cloud backend 100 REST API 117 and rendered in the controller app 109 in step 6083. Benefits to users may include reviewing time point specific SML 203, without playing the video segment 802, thus providing a self-paced method for consuming SML 203, which may include in-context definitions (as uttered in the video 102), priority, part of speech, pronunciation, formality and/or further in-context example sentences for each lexical unit within each subtitle in the video segment 802.

In the method illustrated in FIG. 20, a user may cause a shared video segment 802 to be played back by applying a gesture to the play button 309 overlaid on a video thumbnail 303 (and/or by simply applying a gesture to a video segment thumbnail 303) and the controller app 109 may begin streaming the video by requesting video byte range data from the cloud backend 100 according to the video segment 802 video metadata, e.g. URL/URL parameters for the video segment 802 (e.g. Source URL 106, manifest file, video segment start time, and video segment end time). When a user plays a shared video segment 802, the video player 110 may begin playing the video segment 802 at the segment start point defined when the video segment 802 was created (i.e. on share or on save). While playing the video segment the controller app 109 may continuously check whether the current time of the player 110 is less than or equal to the segment end point defined when the video segment 802 was created, and if yes, may continue to stream the video segment 802. When it is determined that the video segment has reached or passed (slightly as determined by the current time check interval e.g. every 0.5 seconds) the segment end point, then in step 6092, the player head may automatically return to the start time point of the video segment 802 where play automatically begins again, continuing the auto-continuous segment looping. The auto-continuous segment looping may require no user interaction to continue such looping. At any time, in some implementations, segment looping may be cancelled by pausing the video or by activating any other function of the controller app 109. If the video segment 802 looping is cancelled by pausing the video, the full-length video 102 may be viewed by selecting the play function 501 of the video player 110. This may be convenient because the user has both video segment 802 interactivity, and continuity when desired, with the full-length video 102 from which the video segment 802 was created.

Figure 21:
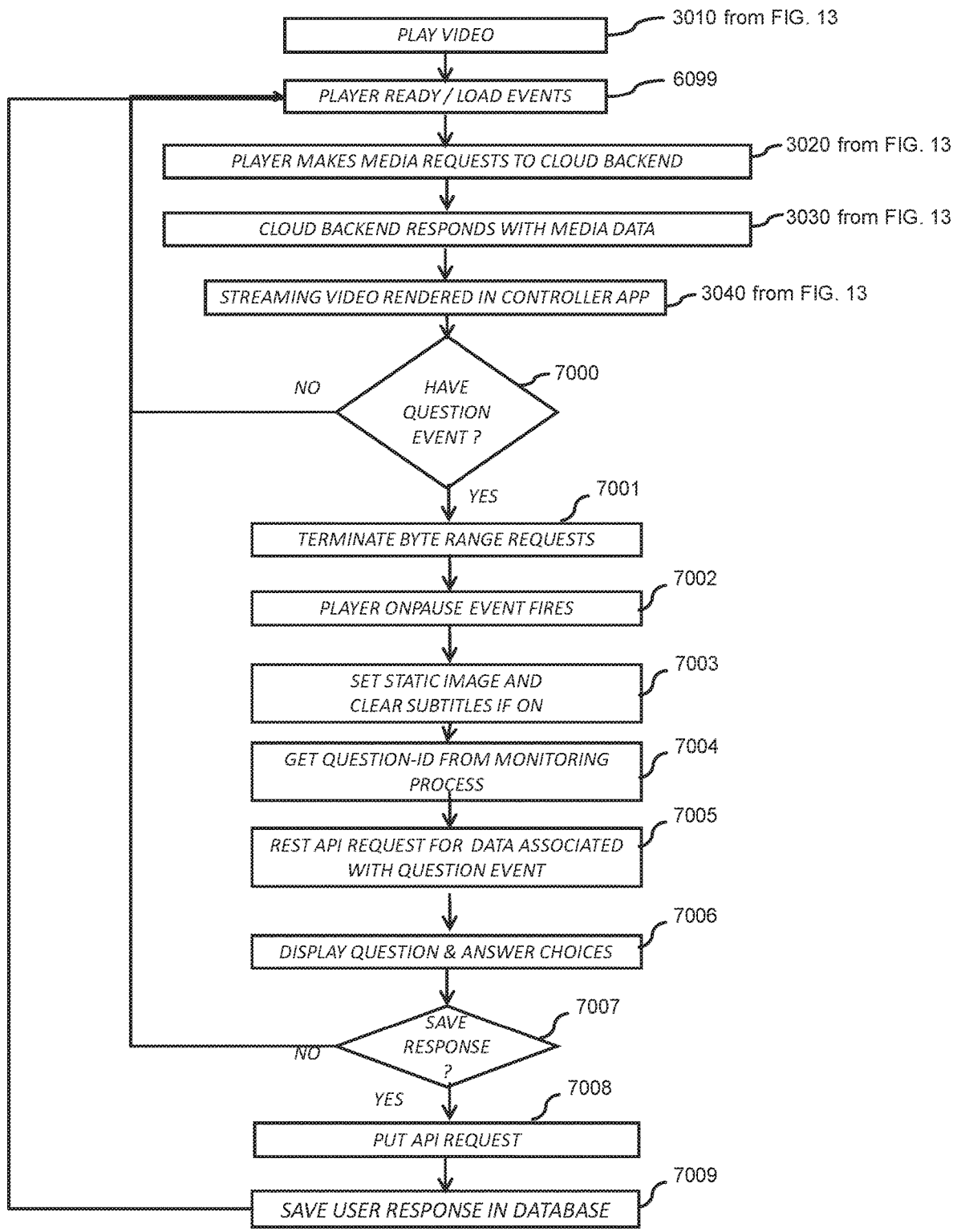
FIG. 21 illustrates an example method for embedding and responding to question events.

FIG. 21 provides an illustrative method for embedding automated question events into a video stream according to some aspects. In step 3010 (which may correspond to the same step in FIG. 13), a gesture may be applied to a video 102, or a video segment 802, which may launch a media player 110 within the controller app 109. In step 6099, the video player 110 ready event may fire and take a callback that loads from the cloud backend 100 an array of player events and associated metadata such as event type, event id, and event time point(s) within the video 102 or video segment 802. In step 3020 (e.g., FIG. 13), the video may begin streaming as the player makes media requests (e.g., via byte range requests) to the cloud backend 100. In step 3030 (FIG. 13) the cloud backend may respond with media data, and in step 3040, video may be rendered in the controller app 109. In step 7000, a monitoring process integrated with the video player 110 process may periodically check the time of the streaming video (e.g. every 0.5 seconds). If the player current time equals or slightly exceeds the time of a player event loaded in step 6099, then the monitoring process may determine the event type. If the event type is a question-for-video-segment or a question-for-video type, for example, then the monitoring process in the controller app 109 may trigger the presence of a question event and fire a player pause command without user intervention at a time point defined by the question metadata and type of video (e.g. video segment 802 or full-length video 102). The automatic pause occurs at the end point of a video segment 802 for questions attached to video segments 802, e.g., for event types of question-for-video-segment. The automatic pause may occur at the question defined time point for full-length videos 102, such as when event type equals a question-for-video type. Pausing the video may terminate byte range requests in step 7001. In step 7002 the onPause event may fire at the defined time, and in step 7003 the screen may display a static image for the paused video and clear any visible subtitles. In step 7004 the onPause callback may receive the unique question-id from the monitoring process (and/or shared memory client-side data store) and in step 7005 the onPause callback may perform a GET request to a cloud backend 100 REST API 117 endpoint with a unique question-id such that the response payload includes the unique question-id, the question type (e.g. beginner, intermediate, expert), the question text, and the question response choices. In step 7006 the question and response choices may be displayed over the paused video screen. In some implementations the question has a question difficulty rating, question text, and question response choices such as True/False or multiple choice. In step 7007, if the user decides to respond to the comprehension question, then in step 7008, a PUT request may be made to a cloud backend 100 REST API 117, and the user's response may be saved by business logic servers in step 7009. Upon save, cloud backend business logic may respond with a message to the controller app 109 asserting whether the response was correct or incorrect along with an indication of the correct answer. Individual user and user population analytics may be performed to determine user accuracy by question and question type over a period of time and comparisons may be made between any user and the overall user population of users by question and question type (e.g. intermediate, expert). The user may decide not to respond to a question and may continue playing the video 102 thus returning to step 3010. The video player 110 configuration options may enable questions to be optionally suppressed during video streaming.

In an embodiment, timed events may have metadata that describes the time of the event and the type of event. Example event types may include question-for-video-segment, question-for-video, and loop-end (in the case of auto-continuous looping). Timed events may have precedence by event type in the system such that in the rare case that two events occur at the exact same time, one event is triggered before the other. In this way, for example, a question-for-video-segment event occurring at the same time as a loop-end event ensures that the video is paused, and the question is displayed prior to repositioning to the segment start and continuing to loop. In an embodiment, question-for-video-segment events and submission of responses to questions do not terminate auto-continuous looping, rather the looping continues after a response is made or after a question is dismissed. In an embodiment, administrative users within an administrative application 108 may author comprehension questions. Such comprehension questions may be associated with videos 102 at specific time points, and such questions may be available to all users of the system. In an embodiment, end users may author comprehension questions at the time a video segment 802 is created and prior to selecting segment recipients. In this case, the recipients of the shared video segment 802 may be the only recipients of such questions.

Figure 22:
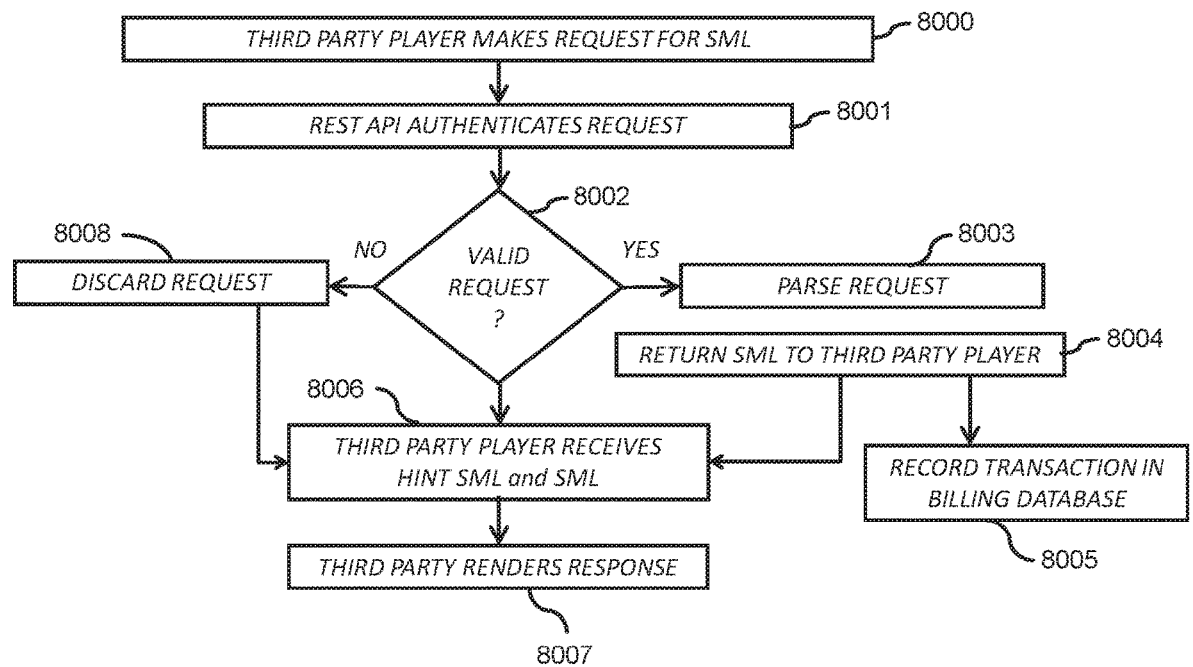
FIG. 22 illustrates an example method to serve SML to third party media applications.

FIG. 22 presents an illustrative method for a web service that serves SML 203 on demand from the cloud backend 100 to authenticated third party streaming media applications according to some aspects. In step 8000 a third-party (i.e. separate legal entities with their own video on demand (VOD) streaming video services) application video player may be paused, triggering a GET API request that passes an authentication token and a payload to a cloud backend 100 REST API 117 that first authenticates the request as shown in step 8001. If the API request is authenticated as a valid request coming from a known third-party, as identified by the authentication token, the request payload may be parsed in step 8003. The payload may include data retrieval parameters such as a unique video-id and a time point. The cloud backend 100 may determine the most recent subtitle time point (whether displayed or not on the third-party video player), and in step 8004, may return a JSON formatted response to the requesting third-party application, such response may include the SML 203 for the paused time point of the third-party player. In step 8005, the successful API request transaction may be recorded in the cloud backend 100 billing database such that on a periodic basis, charges may be billed to the third-party based on the number of successful third-party requests to the REST API 117. In step 8006 the third-party application may receive the JSON formatted response, which may include a single target language subtitle 601, its native language translation 613, its associated Hint SML 202, and its associated SML 203. The method may resolve a problem of query ambiguity since it may be highly likely that users will pause the videos 102 between two subtitles i.e. when there is no visible subtitle on pause. In step 8007, the third-party application may render the received information data set over the paused video player screen. The rendering of the response data may be performed by the third-party application and may or may not follow a preferred data rendering method delineated in FIG. 13. It should be noted that if the API request cannot be authenticated in step 8002, the request may be discarded by the REST API 117 endpoint as shown in step 8008. In such embodiments, the system may become a value-added web service to other streaming video services that have their own video catalogues and VOD subscribers.

Figure 23:
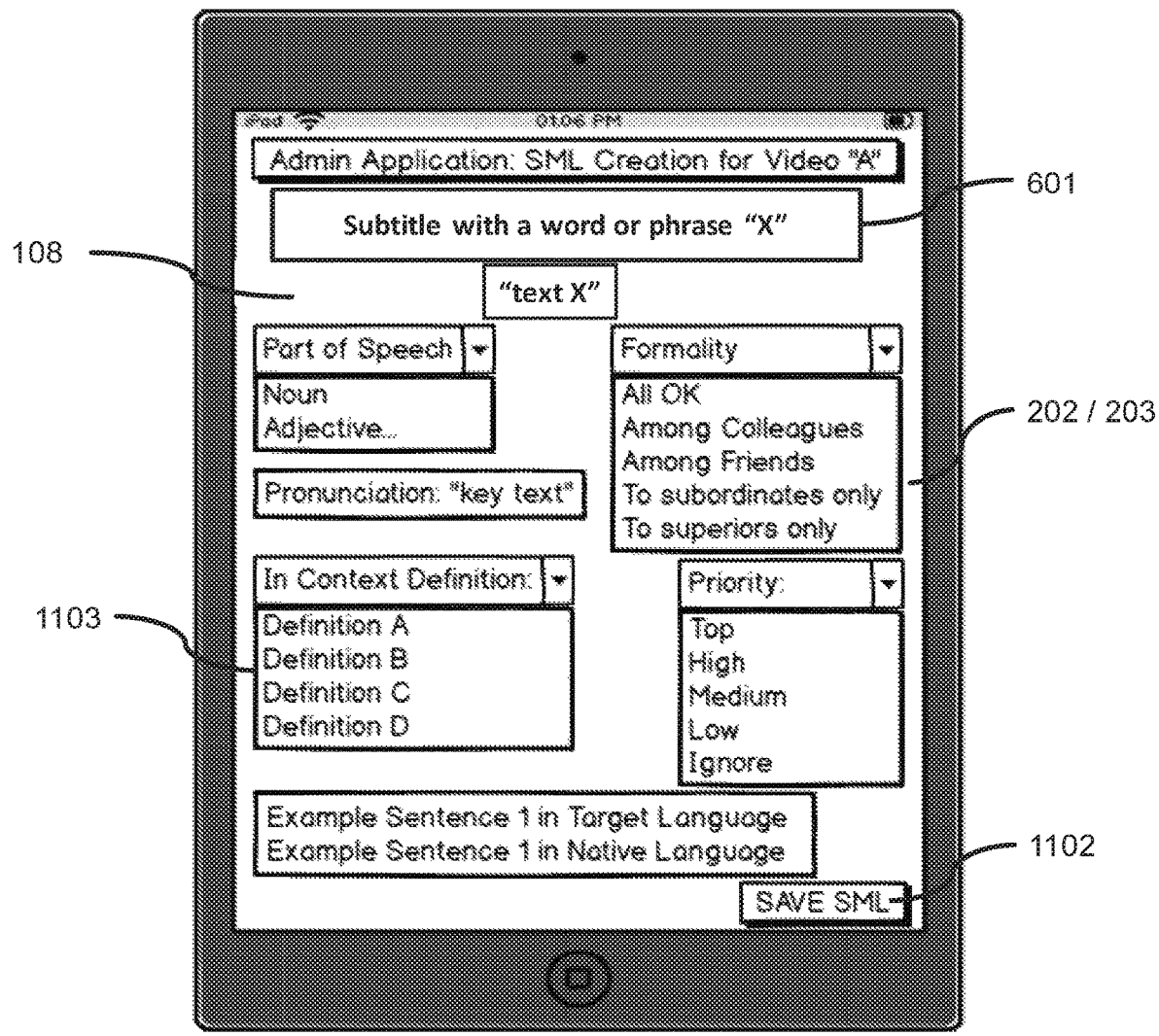
FIG. 23 illustrates an example method to create Hint SML and SML for lexical elements.

FIG. 23 provides an illustrative user interface for an Admin Application (admin App 108) that provides methods to identify, mark, create, associate (with videos, subtitles and time points), tag, input, edit, and save Hint SML 202 and SML 203 in the cloud backend 100 for each discrete lexical element within each target language subtitle 601 in the video catalogue 302, according to some aspects. FIG. 23 shows a content curator (i.e. privileged "editors" in a roles-based access control configuration) in the admin app 108 defining SML 203 for a word or phrase "X". The drop-down menus 1103 and input boxes may enable editors to select phrases and words from each target language subtitle 601 and to create, tag, edit, associate, and save Hint SML 202 and SML 203 (e.g. in-context word or phrase definition, priority, formality, part of speech, pronunciation key, further example sentences and associated pronunciation audio files) for the selected phrases or words (i.e. individual lexical units) within each target language subtitle 601. Content curators may Save SML 203 by applying a gesture to the Save 1102 function in the admin app 108. All Hint SML 202 and SML 203 data, subtitle identifiers and, start/end time point data, and other keys relating such data to unique video-ids, are stored in the cloud backend 100 in a relational database. The cloud backend 100 database may contain all data and information required for paused video mode 2101 (e.g. target language subtitle text, its Hint SML 202, and its corresponding native language subtitle text) and for in-depth mode 2201 (i.e. SML 203 for the target language subtitle 601). The Admin Application 108 may be implemented in all popular client-side design patterns including a web app (e.g. Web Browser, HTML, JavaScript, and CSS), an installed Chrome App, and an installed native app (i.e. Java, Android, iOS, Windows, Windows Mobile).

The admin app 108 may enable system administrators (e.g. content editors within a roles based access control method) to identify, create, mark, associate, and save Hint SML 202 and SML 203 in the cloud backend 100 for discrete lexical units within each target language subtitle 601 in the video catalogue 302: the admin app 108 may incorporate hierarchical roles based access control (e.g. RBAC with specific permissions inherited from group permissions) such that the SML 203 creation process and workflow is highly controlled and organized; as an illustrative example, some admin app 108 users may only be allowed to spot subtitles; others may only pin existing definitions to lexical units (words and phrases); others may be assigned multiple permissions (e.g. to edit and create all target language data (e.g. for English) types including new dictionary definitions); others may only be allowed to translate specific language pairs (e.g. Japanese-English Translators group); others may be content reviewers, while others may be project managers (e.g. a PM group with permissions to add and remove users from specific groups and the permission to assign specific videos 102 to specific users or groups).

Figure 24:
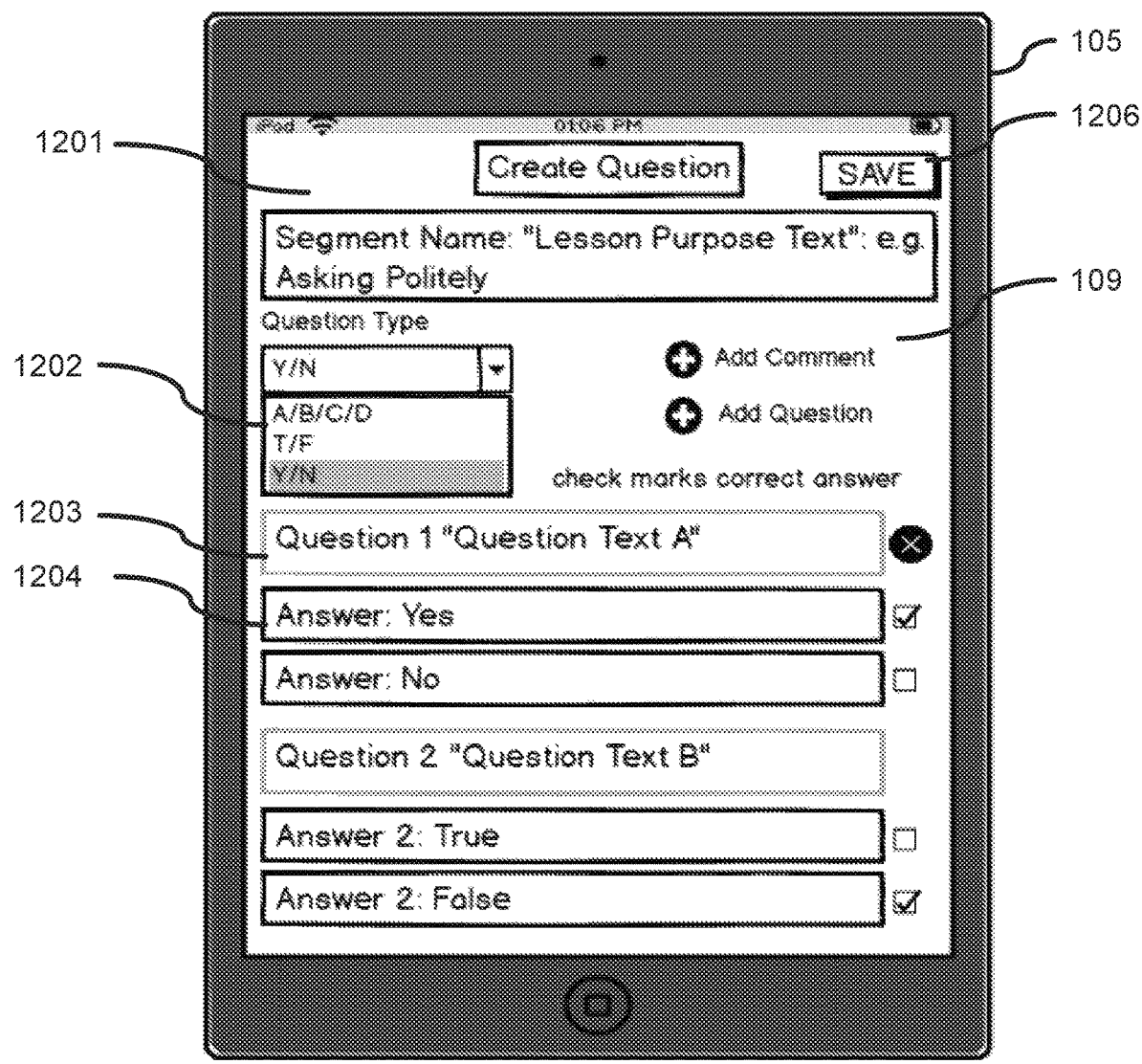
FIG. 24 illustrates an example method to associate questions to video time points.

FIG. 24 provides an illustrative user interface that may allow users to create, input, tag (e.g. difficulty level) edit, save and associate questions 1201 to time points in specific full-length videos 102 and video segment 802, and to store all question related data and metadata in the cloud backend 100 database, according to some aspects. The drop-down menus 1202 in FIG. 24 may provide inputs for the question type e.g. T/F. In step 1203 the question text may be entered, and in step 1204 response choices and correct answer(s) may be entered. In step 1206 the question may be saved in the cloud backend 100. The question creation and embedding method illustrated in FIG. 24 may be available in the preferred embodiment to both system users (i.e. privileged users, i.e. admins, or "editors") and to end users (non-privileged users, i.e. "end users" or users). If an editor attaches a question to a video 102, the saved question may become available to all users of the system (e.g. to all viewers of the video 102). Similarly, in an embodiment, end users may watch videos 102 and may create video segments 802. Prior to sharing video segments 802, they may optionally execute an Attach Question method (illustrated in FIG. 17). Attach Question, in an embodiment, may display a create question method screen as illustrated in FIG. 24. Users may then share (e.g. with selected friends or groups) video segments 802 that have embedded question(s). Video segment 802 recipients may receive a notification in the controller app 109 of the new video segment 802 and a visual indication that a question is included in the video segment 802. Optionally, recipients may receive a push notification (e.g. Apple Push Notification to the device if the controller app 109 is not running in the foreground); the new video segment 802 containing an embedded question event is listed on the user's Inbox Screen 606 as illustrated in FIG. 19; Video segments 802 and videos 102 may be displayed as a video thumbnails and metadata such as video segment name, subject, comment, sending user's username or screen name, date/time of creation, segment length, source video 102 title and/or other metadata.

Figure 25:
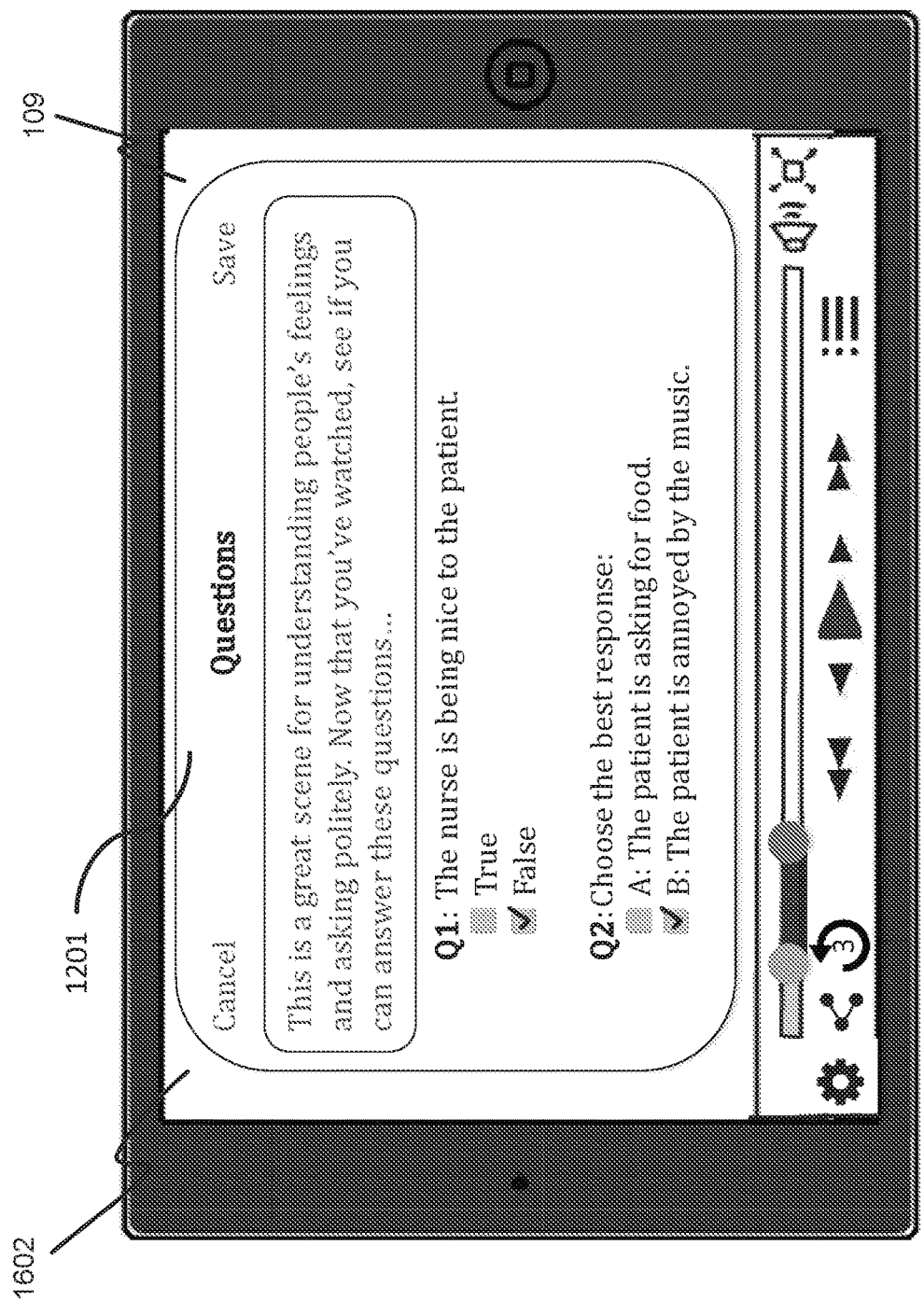
FIG. 25 illustrates an example of a comprehension question overlaid on the display area.

FIG. 25 provides an example of a comprehension question 1201 overlaid on the video display area 1602 in the controller app 109. In an embodiment, questions may be multiple choice, yes/no, and/or true/false. Questions may be related to full-length videos 102 and questions may be related to video segments 802. Users may view the videos 102 and video segments 802 and attempt to comprehend the video content; in the case of a video segment 802 containing a question, the segment may be paused automatically at the end point of the video segment and a question popover screen automatically appears as an overlay to the video 102; if the user responds to questions, and selects Save as illustrated in FIG. 25, immediate feedback in the controller app 109 may be provided to the user along with the correct answer for the question. Auto-continuous looping of the video segment 802 may continue after the feedback is dismissed by the user; correct answers and question results for each user/group may be stored in association with the question 1201 in the cloud backend 100 database; in the case of full-length video 102 having questions, the video 102 may automatically be paused at the time point defined when the question was created: the controller app 109 may display the question 1201 containing question(s) on a popover overlaid on top of the video 102; the user may respond to question questions, and select Save as illustrated in FIG. 25; immediate feedback in the controller app 109 may be provided to the user along with the correct answer for the question; correct answers and question results for each user/group may be stored in association with the question 1201 in the cloud backend 100 database. If the user has trouble answering a question she may Cancel the question and watch the auto-continuous loop for more iterations.

In an embodiment, questions associated with video segments 802 may be created by end users when they create and share video segments 802. In an embodiment, questions associated with full-length videos 102 may be created in the admin app 108 by system admins ("editors") having special system privileges. In the case of full-length videos 102, multiple questions may be attached to a single video 102. Questions associated with full-length videos 102 may be available to the general population of registered end users. Such built-in questions may reduce the need for teachers to construct their own questions and therefore reduce barriers to providing teachers with tools to engage students and measure their progress. In an embodiment, the end user who creates (e.g. a teacher) a question 1201 may receive the question results for each student user within her Inbox screen 606.

Figure 26:
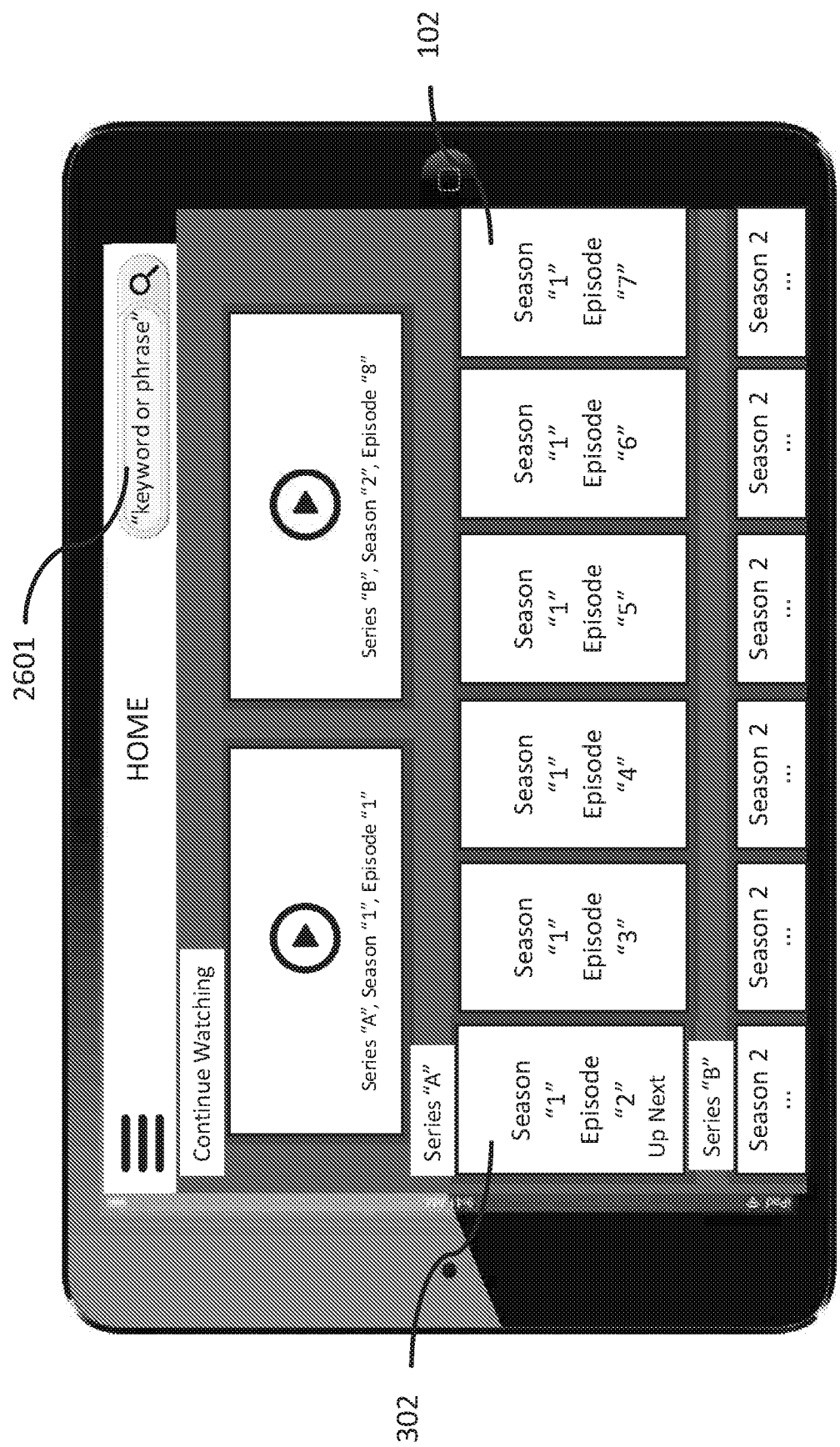
FIG. 26 illustrates an example of a home screen within the controller app.

FIG. 26 provides an example of the home screen within the controller app 109. The home screen may display the video catalogue 302 in a scrollable screen. In an embodiment, videos 102 may be grouped by series or category for easy browsing. The entire home screen display may reflect what each individual user has already watched so the user does not need to remember which episode is up next. FIG. 26 illustrates that the user has begun to watch Episode "1" of Series "A" but has not completed viewing it, thus it is listed under Continue Watching. Likewise, the Series "A" row reflects the episodes that are next in viewing order. In this way, users can watch a multi-episode, multi-season series in episodic order without having to remember which episodes they have already watched. The search box 2601 in FIG. 26 may enable keyword and/or phrase input that searches the entire video catalogue textual data and generates video segments 802 as a result set. These features may be related to the SEARCH-TO-SEGMENT™ features offered by FlickRay, Inc. Typing a keyword or phrase into the search box and applying a gesture to the search icon may execute the search. Search-to-segment features are further described below with reference to FIG. 28 and FIG. 30.

Figure 27:
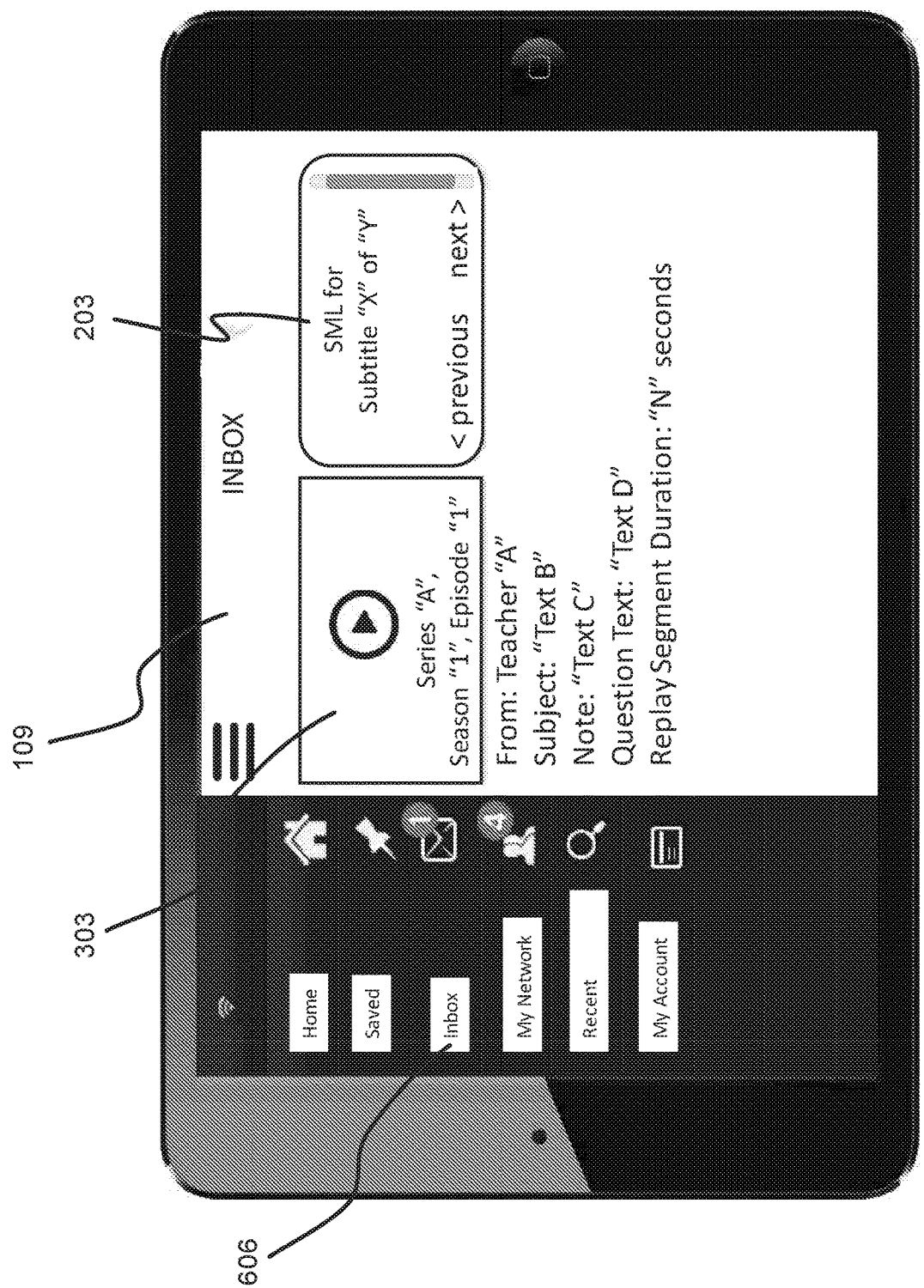
FIG. 27 illustrates an example of an inbox screen for segments shared by users.

FIG. 27 illustrates a slide out menu on the controller app 109 that is opened on the inbox screen 606, according to some aspects. In this illustrative example, Teacher "A" who is connected in the system with this particular user has shared a single video segment 802. The SML 203 within this video segment may be browsable without playing the video segment 802. The presence of a question 1201 within the segment is indicated as metadata information below the video thumbnail 303.

Video segments 802, user created questions 1201, notes, comments, links, messages, audio files, community ratings for user-submitted pronunciation audio files, (collectively "user generated content" 801) may be stored in the cloud backend 100 as a collection of data and metadata such as creator id, friend id(s), video id, video source URL 106, friends/student lists for sharing, video segment 802 definition data, segment video thumbnail 303, free-form user notes, and/or comments including links to other content or files, grouping tags, question-id, question text, question response choices, question correct answers, compilations, and/or playlists, such that the metadata is available and sufficient for immediate search, retrieval, sorting, display, selection, playback, and/or interaction with such user generated content 801 by users and their friends, and by teachers and their students; methods to populate data and metadata may be automatic (system generated), or interactive (e.g. user generated questions).

Figure 28:
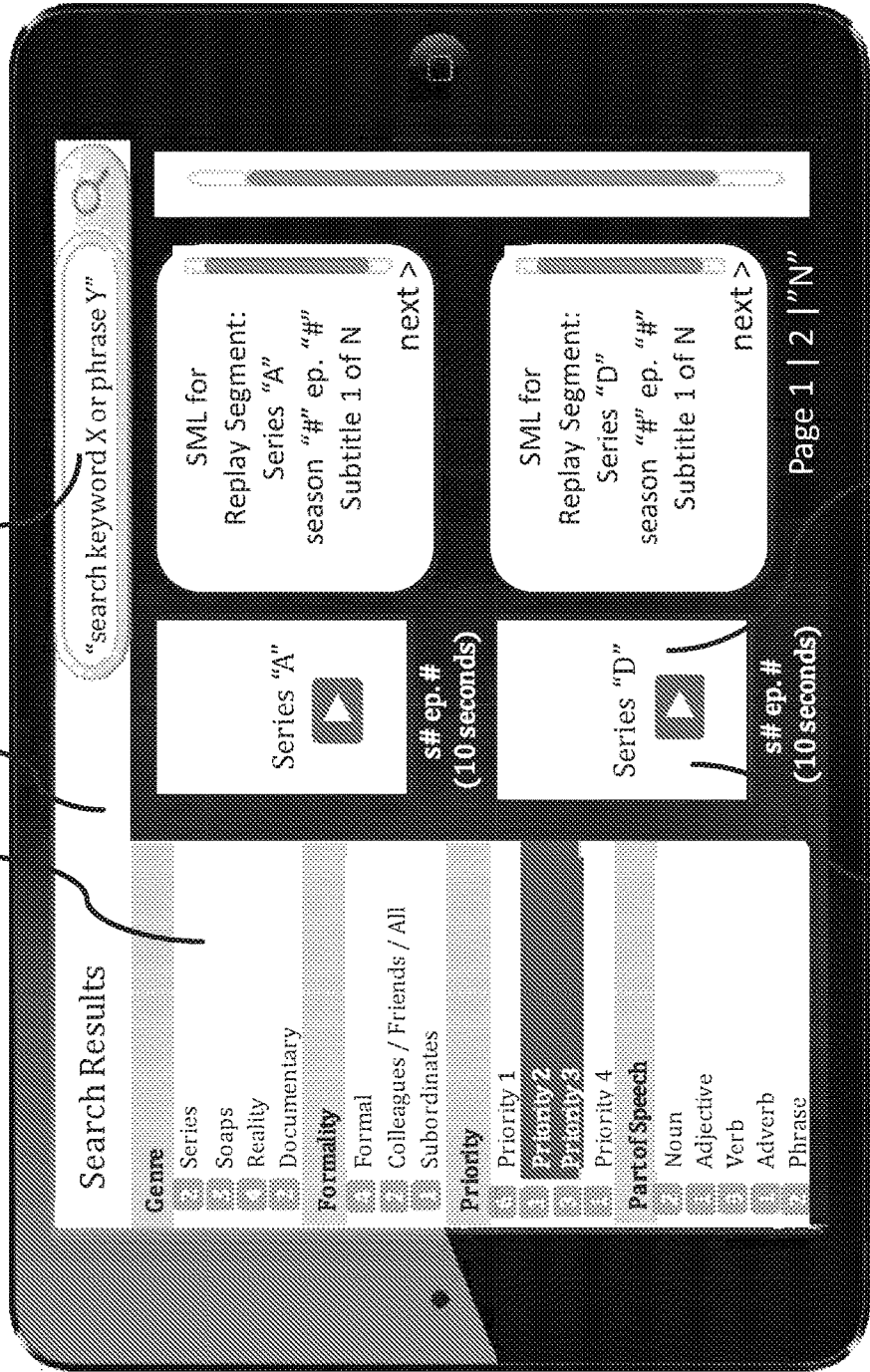
FIG. 28 illustrates an example of a process for generating video segments from search.

FIG. 28 is an illustrative example of search-to-segment features whereby element 2700 allows for search text to be entered into a controller app 109 search box; the search text may be transmitted to cloud backend 100 where it is parsed, stemmed and executed against an in-memory distributed search index wherein the scope of the search is comprised of all SML 203 data, metadata fields (such as Priority), example sentences, and subtitle 601 text for all SML 203 within the entire video catalogue 302 including SML 203 associated with video segments 802. Search "hits" 2730 may be videos 102 or video segments 802 that match or partially match the user's keyword search input; if a hit is found in a video segment's SML 203, it may be included in the search result set; if a hit is a found in a video 102 (i.e. full-length TV episode or full-length movie), the system may automatically generate a video segment 802 of a short duration (i.e. 5-15 seconds) relative to the length of the overall video 102, and may automatically generate a segment video thumbnail 303; the generated video segment 802 may be centered (e.g. +/−4 seconds from search hit's subtitle start and end time points) on the time point containing the search hit. This process may continue until a raw search result set comprised entirely of video segments 802 is calculated; the raw search result set may be further processed prior to transmission to the controller app 109 such that the search results are ranked and sorted by a relevance algorithm, grouped by SML 203 metadata values 2740 (e.g. Priority, part of speech (POS), and Formality, Hit Type (subtitle, or example sentence) and grouped by video metadata 307 values (e.g. Genre, Series Name); hits found within subtitle text 601 may have a higher relevance than hits found in example sentences and may be graphically differentiated or marked thus enabling the learner to pinpoint the most relevant video segments 802 for accelerated learning. Processed search results may be listed in the controller app 109 by search hit count for each metadata dimension (e.g. 4 hits on formal speech as illustrated in FIG. 28), and may be paged such that a limited number of results are transmitted to the controller app 109 yet the full result set may be accessible via selecting other pages of results; the search request/response may be sent transmitted over standard protocols such as REST over https; results may be displayed in the controller app 109 and sorted by relevance: linguistic navigation facets 2740 may be provided as navigable search refinement options enabling users to drill down of the results according to their personal interest Facets are illustrated on the left panel in FIG. 28, and in this example include Genre, Formality, Priority, and Part of Speech.

FIG. 28 also illustrates that the user has selected multiple facets: Priority 2 and 3. When a gesture is applied to facets, the results screen right hand panel may update and narrow the search results to video segments 802 that match both the selected facets and the keyword search. Users can then stream the video segments that correspond to their personal learning objective (e.g. to learn high priority, formal language). SML 203 for the video segment 802 may be displayed to the right of the video segment thumbnail 303 in a scrollable window, and for learning convenience, SML 203 may be viewable and navigable by time points within the segment (i.e. next/previous) without playing the video segment. In an embodiment, the hit text may be highlighted within the scrollable window containing the SML 203 for the search-generated video segment 802.

Figure 29:
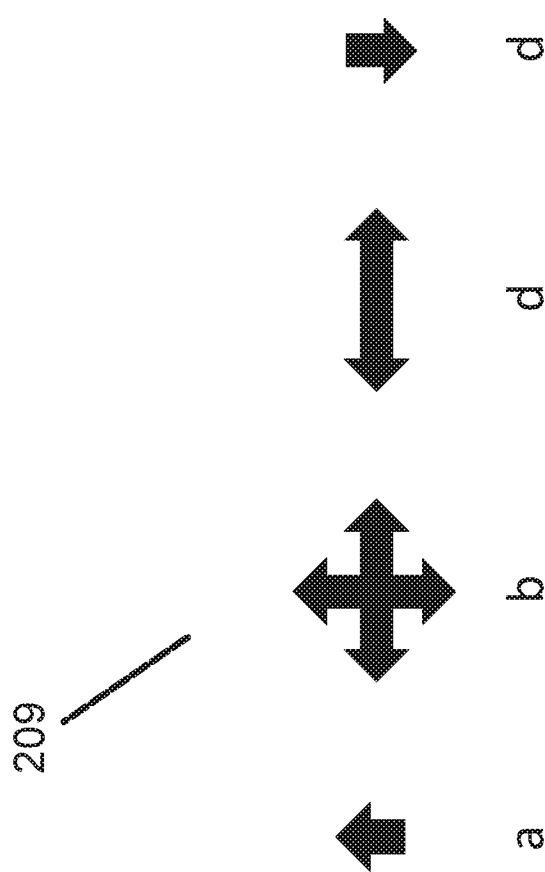
FIG. 29 illustrates example graphical formality indicators.

FIG. 29 illustrates an exemplary graphical formality indicator according to some aspects. Most languages, if not all, have a notion of formality. In some languages such as Japanese, the words themselves change to reflect different situations. Such morphologies are easy for Japanese learners because the rules are clear regarding which words to use in a given situation. However, in languages such as English, there are no written rules that universally govern formality. Take the illustrative examples: A) Would you mind emailing the document as soon as possible? B) Please email the document now. Sentence A) is more far formal than sentence B), but the problem is that the student has no convenient way to know the difference. The graphical formality indicator 209 may be an indicator of appropriate communication recipients for a given lexical unit within the SML 203. Since formality is a continuum running from highly informal to highly formal (assuming crude language is in a category of its own), the graphical formality indicator may be a rapid guide to apt usage. In an embodiment, four levels of formality may be indicated graphically, thereby striking a balance between modeling a formality continuum and ease of learning. FIG. 29 illustrates an example formality indicator having a) a single up arrow that indicates a social superior such as a boss or an elder, is the appropriate recipient b) up and down and right and left arrows that signify any recipient is appropriate to receive the lexical unit in communication c) a horizontal two-sided arrow that indicates friends and colleagues are appropriate recipients and d) a single down arrow that indicates the lexical unit is appropriate only towards lower social status such as a young child (e.g. "sit down", would be marked by d) since it is direct imperative language). It should be noted that other graphic depictions of a formality indicator are possible as are other possible levels of formality.

Figure 30:
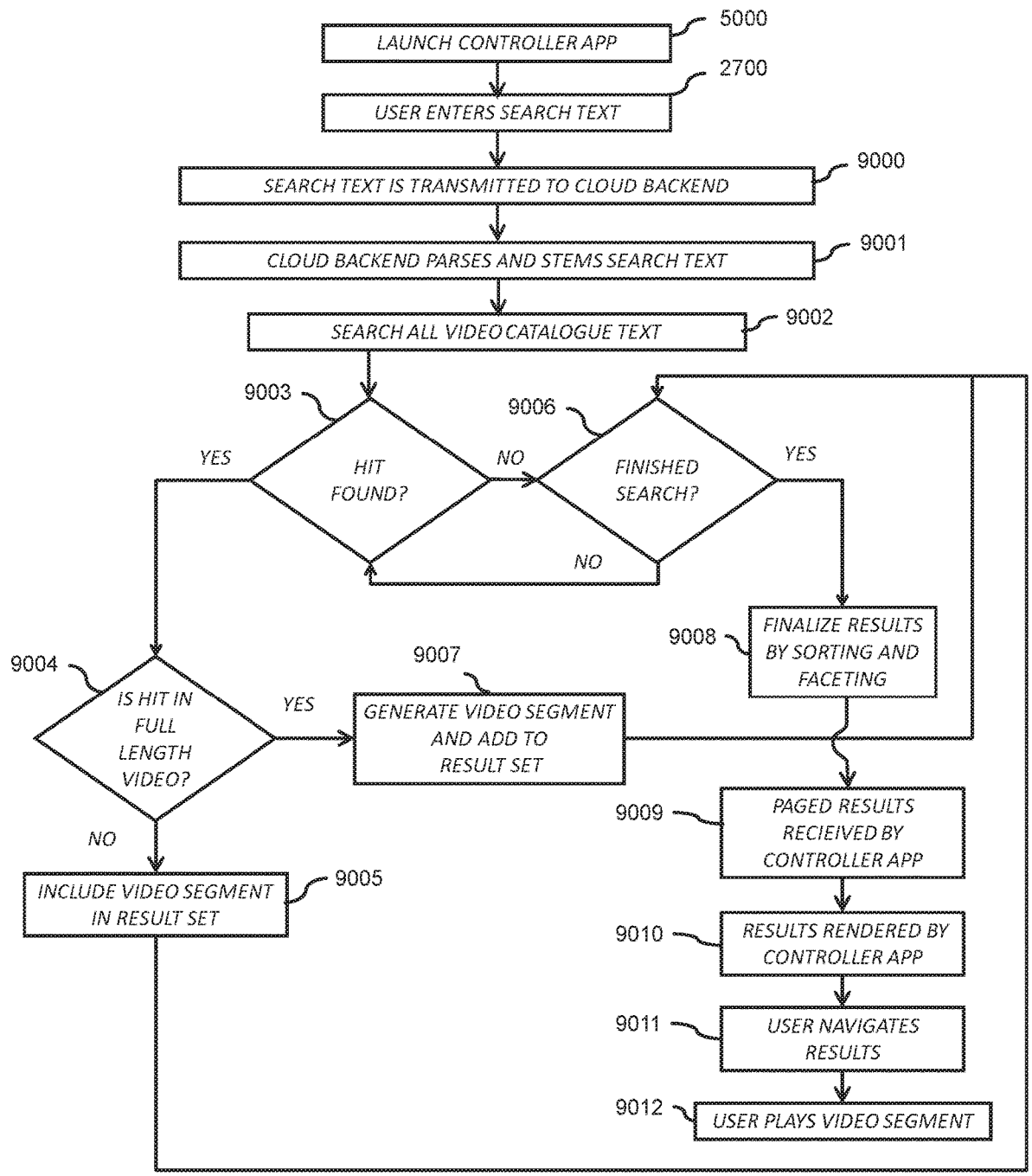
FIG. 30 illustrates a method to generate video segments from search.

Certain data associated with shared content may be open for connected users (friends or teachers) to add further information such as comments; for example, multiple user comments and annotations may be posted to a video segment 802 having questions 1201 thereby facilitating a community of users that learn from and with each other;

FIG. 30 presents a flow diagram of a method in an embodiment to generate video segments 802 from search text (i.e. search-to-segment). In step 5000 (FIG. 15) the controller app 109 may be launched on the controller device 105. A user desires to comprehend a word or phrase as may be used in videos 102 within the video catalogue 302. So, in step 2700 (FIG. 28) the user may enter a search string (search text) of a word or phrase into a search box within the controller app 109, which then may send a GET request containing the search text to the cloud backend, where in step 9001, the cloud backend 100 REST end point servers may parse and stem the search text, and subsequently in step 9002 execute a query against a distributed in-memory search index that holds all text and metadata for the entire video catalogue 302. The search index may be an efficient in-memory mapping of the relational data stored within the video catalogue 302, in particular video metadata 307 such as source video URL, video id, target language subtitle tracks and their start/end time points, as well as related SML 203 text and/or related metadata (e.g. part of speech, formality, priority) for lexical elements within subtitles. In step 9003 the search servers may iterate over the search index looking for matches (i.e. "hits") between the stemmed search text and the search index records. When a match is found, step 9004 may determine if the hit is within a full-length video 102. If NO, then the hit may be determined to be within an existing video segment 802 and in step 9005, the video segment 802 may be added to the search result set. If the search is not finished as determined in step 9006, further hits, if found, may again be evaluated in step 9004 to determine if the hit is within a full-length video 102. If YES, then in step 9007 a video segment 802 may be generated in memory and added to the result set in memory. In step 9007, to generate a video segment 802 from a full-length video 102, a first hit reference may be defined as the start time point of the subtitle within which the hit was found (even if the hit was in an example sentence within the SML 203 for that subtitle) and may be offset minus a fixed short time (e.g. −4 seconds) in seconds thereby defining the video segment 802 start point. Then, a second hit reference may be defined as the end time point of the subtitle within which the hit was found, and may be offset plus a fixed short time (e.g. +4 seconds) in seconds from the subtitle end point, thereby defining the end point of the video segment 802. The video segment 802 may further be defined in memory by the unique video id of the source full-length video 102, and its URL. Such video segment 802 may not generate new picture or sound data. The process continues until the search has completed. When the search has been completed, the result set may be finalized in step 9008 by sorting and faceting the results. Sorting may incorporate various rules such as relevancy based on where a hit is found (e.g. a hit found in a subtitle may be given a higher relevance score than a hit found within an example sentence). Navigation facets and hit counts may be generated such that the results may be presented in a way that enables users to quickly navigate the results based on hit metadata (e.g. linguistic dimensions) that align with the user's interest in the search text (e.g. priority, part of speech, and formality for the search phrase or word). In an embodiment, the in-memory search index may be built from relational data (e.g. SML 203, Hint SML 202, video metadata 307) stored in the video catalogue 302, which in an embodiment may be persisted within a relational database on standard server hardware. In step 9008 a JSON formatted result set may be generated in the cloud backend 100. In step 9009, the controller app 109 may receive and parse the result set which may be paged server-side for scalability in the case of large result sets. In step 9010, the controller app 109 may render the results for display to the user. In step 9011 the user may navigate result set facets for the desired linguistic context and in step 9012 may apply a gesture to a video segment thumbnail image to initiate streaming of a desired video segment 802. Such video segment 802 may begin play from the video segment 802 start point defined when it was generated by the search action and may loop auto-continuously until the user decides to end segment looping by gesturing any other function within the controller app 109.

A system for language learning, according to some aspects disclosed herein, may incorporate client side state, events, event listeners and event callbacks that are implemented in various combinations and business logic to form the interactive features of the system. As an illustrative example, when the user pauses the video player 110, the player API 115 may fire the onPause event and a callback initiates a getCurrentTime API call for the currently streaming video 102. The current time of playback and unique video-id may form the parameters sent by the controller app 109 to the REST API endpoint 117 where business logic server endpoints collect the parameters and perform a lookup via a SQL query against the cloud backend 100 database for the most recent subtitle for the unique video-id.

The response data sent to the client may fulfill the requirements for both paused video mode 2101 and in-depth mode 2201, the information comprised of the text of the target language subtitle 601 currently visible on the paused display (or most recently viewed subtitle if paused between subtitles), its Hint SML 202, the text of the corresponding native language subtitle 613, and/or the corresponding SML 203. A further gesture applied to the Show All SML button 1603 while in paused video mode 2101 may transition the controller app 109 to in-depth mode 2201. In-depth mode 2201 may display SML 203 in a scrollable pop-over window 701 placed on top of the paused video 102;

The system may incorporate video player 110 commands and API events that include Pause, Play, Seek, Rewind, Forward onPause, onPlay, onSeek, onRewind, onForward, onEnterFullScreen, onExitFullScreen, getCurrentTime (of player head), setSubtitleTrack, setLanguage, setThumbnail, onQuenstionForVideo, onQuestionForSegment, setURL (for the streaming video 102), for example and in some implementations.

The system may incorporate a user registration method. The data from registration may include a unique user id and a user password among other user metadata, all of which is stored in a user profile in the cloud backend 100. The registration method may record the user's native language (e.g., the user's mother tongue), which is set and stored in the user's profile in the cloud backend 100 database. The user's native language may determine the language of native language subtitles 613 and the translation language for target language content throughout the system, e.g. target language subtitles 601 and/or translations of SML 203 content such as disambiguated definitions. The user's native language may further determine the default keyboard for user generated content 801. Systems and methods described herein may store user profile data and user metadata ("user information") in the cloud backend 100. Such user information may include screen name, age, country, state/province/prefecture, gender, native language, subscription and billing information, friends lists, teachers, parental control settings, username, passwords hashes, recently viewed videos 102, question results, ability level, ability percentile rank, and/or user preferences. Embodiments, according to some aspects disclosed herein, may provide localization such that interface menu elements such as buttons, tabs, pop up screen names, user alerts, and/or error messages may be presented in the user's native language as determined and set when the user registers to use the system.

In some implementations, a system for language learning may support the UTF-8 character set, multilingual input and display for both user generated content 801, video metadata 307, and/or other system data as needed or appropriate (e.g. copyright notices). The system may incorporate a method to authenticate users of the system and/or a method to verify that the user has a valid paid subscription to the system.

The system may incorporate a method that enables users to connect with other users within the system. Such connections may be initiated by users in the controller app 109 and stored in the cloud backend 100. In an embodiment, users may tag their connections as friends, teachers, students, and/or members of a named group (for example, a teacher can create a group called "English 101" which is comprised of her connected users who are studying in her English 101 class). Named groups may be used for sharing videos 102, video segments 802, questions 1201, and/or other user generated content 801 without having to select each individual member of the group. Groupings may be considered a type of user generated content 801 and may be stored in the cloud backend 100. Relationships among users may be listed under the My Network screen in the controller app 109. The system may enable interaction among connected users. Interaction may include question 1201 sharing, texting, messaging, note sharing, voice calling (i.e. voice over IP), conference calling, video 102 sharing, file sharing, video segment 802 sharing, user generated content 801 sharing, and/or video calling.

For additional user convenience, multiple controller bar 1604 actions may be chained and mapped to keyboard shortcut keys or other user input methods (such as a hot button). For example, while video 102 is streaming, the up-arrow key may initiate a chain of two controller bar 1604 actions: pause video and Show All SML.

SML 203, according to some aspects described herein, such as definitions and example sentences may be presented bilingually in the user's native language and in the target language (e.g. the original language of the video itself).

In some embodiments, play/pause button 501 on the controller app 109 interface may be selected by the user (e.g. touched or alternatively a voice command is issued) when she would like to study the meaning of the current subtitle 402 visible while streaming. When selected, the play/pause button 501 on the controller app 109 may initiate a pause command message that is sent to the player application programming interface (player API 115) of the video player 110, and such pause command when received by the video player 110 may pause the video 102 by instructing the video player 110 to stop requesting video segments from the origin server 114/CDN (content delivery network). The user may then be in paused video mode 2101.

In some embodiments, the system may provide a caching method by which recently viewed or partially viewed videos 102 are cached for each user in the cloud backend 100 or on the controller device 105 such that recently viewed videos may be available for play or continuation from the controller app 109 interface. In some embodiments, the system may provide a caching method by which recently viewed SML 203 are cached for each user in the cloud backend 100 or on the controller device 105 such that recently viewed SML 203 are available for viewing from the controller app 109 interface.

Users may register in the system as teachers and may be granted certain additional application functionality such as attaching questions to videos 102 and video segments 802 (for example, attaching questions to video segments may be limited to certain groups of registered users as a premium feature). Verified teachers, in an embodiment, may be offered special subscription pricing by virtue of the "teacher" tag associated with the unique user id.

The system may, in some embodiments, incorporate methods to calculate, store, and report to students and teachers individual and group performance statistics (such as student rolling averages) for questions 1201. For comparison purposes, question statistics may be calculated for the entire population of registered users, for users within a specific country, for users in a specific company, for students of a specific teacher, and/or for individual students. As an illustrative example, a student may have a rolling average of 90% correct responses over the past 3 months for questions classified as "intermediate difficulty," whereas the population of users within the same company (business) scored 80% accuracy on intermediate level questions over the same time period.

The system may incorporate a real-time notification method whereby connected users (friends, students-teachers) receive notification (while offline or online) whenever user generated content 801 and/or system generated content (e.g. question results) are received. The user may have the option to turn on/off certain notifications sent to the controller app 109;

The system may provide methods to share video 102 and video segments 802 links, annotations, and video thumbnails 303 to popular social networks such as Instagram, Facebook®, YouTube, and Vine.

The system may provide a method for users to submit digital voice recordings from the controller app 109 and save them in the cloud backend 100 for the purpose of evaluation of student pronunciation proficiency. The method may enable users to record and attach to particular video segment 802 an audio file of the user's reading of a particular subtitle or set of subtitles within the video segment and the ability submit the resulting data package containing the digital audio file and video segment to the cloud backend 100 such that a teacher, friend, or a community of reviewers can then watch the video segment, listen to the user's audio file, and then respond to the user with a proficiency rating or other feedback in text, audio, or video form attached to the same user-submitted package and thereby the feedback is shared with the submitting user within the system for the purpose of improving the user's pronunciation of the target language. Some embodiments may provide a method for a teacher, group of teachers, and/or a community of native speakers to listen to user's digital voice recordings to assess the pronunciation skills of individual language students and to provide students with a quantitative and qualitative scores for their pronunciation skill level.

The system may collect a subscription payment from users of the system via an online electronic payment method. Payment amounts may depend on several factors such as the user's country, bandwidth utilization, subscription duration, and subscription type (e.g. SD, HD, 4K). The system may enable the user to view, and update account information such as time remaining in subscription, type of subscription (HD or SD), email address, and credit card information among other related account information displayable under "My Account" in the controller app 109.

Thus, according to some aspects, exemplary embodiments may provide a hierarchical computer-based method for language learning. The method may comprise streaming a video over a network to a connected electronic device. The video may be received on the electronic device and displayed in a video player. The method may display subtitles overlaid on a video in a user-selectable language comprised of the original language of the video and the user's native language. The method may comprise responding to a video player paused event by terminating device requests for streaming video segments. On the pause event being detected, and while remaining in full-screen mode if active, the method may comprise sending a first query to a cloud hosted API endpoint connected to a cloud hosted database. The query response may comprise the translation of the paused subtitle text in the user's native language and the subtitle text in the original language of the video. The method may display a video overlay comprised of data from the first query comprising the current subtitle in the original language of the video. The method may simultaneously display the translation of the paused subtitle in the user's native language.

A second query request initiated interactively and/or automatically in response to the pause event may be sent to a cloud hosted API endpoint connected to a cloud hosted database. The second query request may comprise metadata uniquely identifying the video and uniquely identifying a subtitle within the video. The response to the second query may comprise Subtitle Markup Language (SML) associated with the paused subtitle. The SML may be uniquely associated with the paused subtitle. The SML associated with the paused subtitle may comprise the in-context definition of subtitle words, phrases and/or idioms in the originally produced language, translations of in-context definitions into a user selectable or as-registered native language; audio pronunciations for one or more words, phrase, and/or idiom in the subtitle, displaying phrases as phrasal formulas, a graphical formality indicator for each word, phrase, and/or idiom, and/or a learning priority classification for each word, phrase, and/or idiom, and/or an visual indicator whether a subtitle was corrected to conform to standard grammar. The method may comprise displaying the SML in a scrollable window overlaid on the paused full screen video. The scrollable window may enable a user to instruct the system to request, retrieve, and display the next and/or previous subtitle and its corresponding SML. Based on user input resuming the video, the method may comprise continuing the video stream from the pause point. A REST API endpoint may be exposed to and called by a third-party video player. In some implementations, the third party may be billed for the number of requests. Corresponding systems, devices, and computer-readable media are also within the scope of the disclosure.

And, according to some aspects, exemplary embodiments may provide a system for implementing video-based language-learning. The system may comprise a memory device and one or more processors in communication with the memory device. The memory device may store instructions that, when executed by the one or more processors, cause the system to perform a method for video-based language-learning. The system may store a video catalogue. For example, the system may store a video catalogue in a cloud hosted database. The video catalogue may be displayed on an electronic device. The system may stream video from remote servers and cause display of subtitles overlaid on the video on the electronic device. The system may pause the video stream in response to user input and cause simultaneous display of a subtitle and its translation in the user's native language. The system may provide a cloud hosted API connected to a cloud hosted database hosting SML data. The cloud hosted API may accept query requests over secured connections, such as HTTPS, TCP, secured websockets, and/or any other suitable secured connection. Query requests may contain metadata that identifies a specific subtitle. A query response may contain SML data related to the specific subtitle. The system may create, store, and share video clips from original full-length source video (TV shows or movies) by defining video metadata comprising a unique video identifier, a start time, an end time, a user-definable annotation, and/or a recipient list. The system may store video clip metadata in a database for retrieval and cause display of select-for-play thumbnails on a device graphical user interface.

The system may provide an SML authoring system, allowing authorized users to create, edit, and store SML in a database accessible over the Internet. The system may support SML creation within a distributed, roles based SML authoring system.

The system may insert hidden metadata tracks not displayed to the user that signal the player for the arrival of a comprehension question. The system may pause the video automatically upon the arrival of a comprehension question. User responses to a comprehension question may be submitted to the cloud database for evaluation. The system may track, over time, user comprehension statistics on a rolling average.

The system may support a search for a word or series of words from the device interface wherein the search scope is the entire subtitle textual database from all videos in the catalogue. Searches may be configured to hit a time point equal to the subtitle start time point of the subtitle(s) containing the searched word or words within a video. The system may retrieve video clip(s) generated from the searched word or words by executing a server algorithm that adds a fixed number of seconds N before and after the search hit time point, thereby creating a video clip from a full-length source video (TV shows or movies) based upon search hits. The system may display search results corresponding to the searched word or words wherein search results are displayed as select-for-play thumbnails and viewable subtitle script with associated subtitle markup language. The system may refine search results via navigation facets, such as video genre, formality level, priority, and word or phrase part of speech.

The system may provide a user configurable video auto-continuous video looping function based on a user configurable loop duration parameter comprising the number of seconds before the current time point. The system may store user defined looping parameters on the device. The system may generate loops based on user input. A loop may have a start time and end time determined based on the current time and a defined loop duration. In some implementations, the start time may be equal to the current time minus half the loop duration, while the end time may be equal to the current time plus half the loop duration. Corresponding methods, devices, and computer-readable media are also within the scope of the disclosure.

In some implementations, users may open their electronic controller device and open the controller application. The user may be challenged for log-in credentials. Upon supplying credentials such as user id and password that verify an active trial account or an active subscription, the participant may be presented with a Home screen having a greeting message and a browsable and searchable video catalogue. The user may choose a specific video for viewing and may proceed to watch the video playing on the controller device and optionally mirrored (cast) to a large screen display. Video streaming may continue until such moment when a subtitle piques the learning interest of the user, at which time the user may pause the video. The paused screen may then display the subtitle in the target language subtitle, its Hint SML, and the translation of the target language subtitle in the user's native language such that the user can easily identify discrete lexical units within the subtitle, such as phrases. A gesture on a discrete lexical unit may cause the retrieval from the cloud backend the SML for that lexical unit or the user may simply select Show All SML and all linguistic information for the subtitle may be displayed for the user. SML may include the disambiguated definition (e.g., the precise definition as used in the context of the subtitle) and thereby may greatly reduce the superfluous information normally found in a typical online dictionary. The user may continuously loop short segments of video to enhance the learning immersion. Video segments of short duration may be saved for later study and shared with friends from the controller app.

In some implementations, to create SML a privileged system admin may play a video and pause the video using an admin app. A system admin (such as a content editor) may select a word or phrase and retrieve via a gesture all definitions from the cloud backend. The disambiguated meaning may then be selected from the interface for that word or phrase and saved in the backend cloud as SML for that specific subtitle. In doing so, the superfluous meanings may be removed by the method such that end users, when viewing the SML within the controller app for a particular word or phrase, are only presented with that specific definition as used within the context of the specific subtitle. The curation process may be repeated until all words and phrases in a video are disambiguated and stored in the cloud database for each subtitle across all videos in the catalogue. Additional lexical and pedagogical information may be input and saved to the cloud backend to complete the SML creation for each lexical unit for all subtitles in the video catalogue. To review and edit saved SML, content editors may play the video and pause at various video frames using the administrative app. The administrative app may display the Hint SML, and SML and the content curator may have the option to create, update, and delete SML.

In some implementations, to create questions, controller app users (such as end users registered in the system as teachers) may create learning content such as questions that are attached to specific videos and video segments. The teacher may send the questions to her students within the system by selecting her connected students or group of students (e.g., a class) who may be immediately notified when a new question arrives for them within the system. Questions may also be created by content editors in the admin app and attached such that the general population of users receives videos with those questions (i.e. public questions).

Although embodiments herein have been described with respect to video content, in other embodiments the methods and features described herein may be applied to streaming music players. In general, streaming audio (and/or locally stored audio) may be handled in the same way as video content described above, and the user may be provided with subtitles and linguistic contextual information in the same manners just with video content replaced by audio content.

Other embodiments will be apparent to those skilled in the art by considering the specification and description of the invention disclosed herein.

What is claimed is:

1. A computer-implemented method for language learning, the method comprising:
   receiving, by a user device, a request to display a video;
   sending, by the user device and to a server, a request for a stream of the video;
   displaying, by the user device, audiovisual content based on the stream of the video;
   receiving, by the user device, a request to pause display of the video at a first event time;
   sending, by the user device to the server and in response to the request to pause display of the video, a request for a most recent subtitle associated with the video, wherein the most recent subtitle has a corresponding start time less than or equal to the first event time and is in a target language associated with the audiovisual content;
   receiving, by the user device and in response to the request for the most recent subtitle, first response data comprising a target language subtitle that corresponds to the most recent subtitle and is in the target language;
   displaying, by the user device and in response to the request to pause display of the video, the paused video, the received target language subtitle, and a corresponding native language subtitle, wherein at least one of the target language subtitle and the native language subtitle appears in response to the request to pause display of the video, and wherein the native language subtitle corresponds to the target language subtitle and is in a native language that is associated with the user and is a different language than the target language;
   receiving, by the user device, a request to display additional context corresponding to the target language subtitle; and
   displaying, by the user device and in response to the request to display additional context, visual indicia indicating context and usage of at least one word or phrase of the target language subtitle.

2. The method of claim 1, wherein the visual indicia is generated based on additional context data comprising markup language data associating the at least one word or phrase of the target language subtitle with at least one of: an in-context definition, priority, part of speech, pronunciation, formality, or in-context example sentences.

3. The method of claim 1, wherein sending the request for the most recent subtitle comprises:
   terminating, by the user device, requests to the server for the stream of the video in response to the pause request, thereby pausing the video.

4. The method of claim 1, wherein the request for the most recent subtitle comprises an indication of the first event time and a unique video identifier associated with the video.

5. The method of claim 1, wherein the first response data further comprises additional context data corresponding to the context and usage of the at least one word or phrase in the target language subtitle.

6. The method of claim 5, wherein the additional context data is determined based on using a unique subtitle identifier associated with the target language subtitle.

7. The method of claim 1, further comprising:
   sending, by the user device and to the server, a request for additional context data corresponding to the additional context in response to the request for additional context, wherein the request for additional context data comprises an indication of the target language subtitle and a unique video identifier associated with the video.

8. The method of claim 1, wherein the request to pause display of the video is received during a display of the most recent subtitle on the audiovisual content.

9. The method of claim 1, wherein the request to pause display of the video is received after a display of the target language subtitle on the audiovisual content has ended but before display of a next subtitle.

10. The method of claim 1, further comprising:
    receiving, during display of the additional context with the paused video, a request to change to a previous or next target language subtitle associated with the target language subtitle;
    determining the previous or next target language subtitle based on the first event time; and
    updating the display of the paused video to display the previous or next target language subtitle, a corresponding previous or next native language subtitle, and corresponding previous or next additional context.

11. The method of claim 1, further comprising:
    receiving, during display of the additional context with the paused video, a request to change to a previous or next target language subtitle associated with the target language subtitle;
    determining the previous or next target language subtitle based on a previous or next subtitle identifier associated the target language subtitle; and updating the display of the paused video to display the previous or next target language subtitle, a corresponding previous or next native language subtitle, and corresponding previous or next additional context.

12. The method of claim 1, further comprising:
calling a first Application Programming Interface (API) endpoint provided by the server to request the stream of the video; and
calling a second API endpoint provided by the server to request the target language subtitle, the corresponding native language subtitle, and the corresponding additional context.

13. The method of claim 1, further comprising:
calling a third Application Programming Interface (API) endpoint provided by the server to request a previous or next target language subtitle, a corresponding previous or next native language subtitle, and corresponding additional context.

14. The method of claim 1, wherein the visual indicia corresponding to the additional context comprises one or more of the following:
highlighting of the one or more words; or
a font style applied to the one or more words.

15. The method of claim 1, wherein the request to pause display of the video is received while subtitle display is disabled by the user device.

16. The method of claim 1, wherein sending the request for the most recent subtitle comprises:
terminating, by the user device, requests to the server for the stream of the video in response to the pause request, thereby pausing the video.

17. A computer-implemented method for language learning, the method comprising:
displaying, by a user device, a video in a first mode, wherein displaying the video in the first mode comprises:
displaying the video and subtitles in a first language; or
displaying the video without subtitles;
receiving, by the user device and during display of the video in the first mode, user input indicating a request to pause the video at a first event time;
sending, by the user device to the server and in response to the request to pause the video, a request for a most recent subtitle associated with the video, wherein the most recent subtitle has a corresponding start time less than or equal to the first event time and is in the first language;
receiving, by the user device and in response to the request for the most recent subtitle, first response data comprising a first subtitle that corresponds to the most recent subtitle and is in the first language;
displaying, by the user device and in response to receiving the request to pause the video, the video in a second mode, wherein displaying the video in the second mode comprises displaying:
the paused video,
the received first subtitle in the first language, and
a corresponding second subtitle comprising the first subtitle in a different second language, wherein the second subtitle is not displayed in the first mode; and
receiving, by the user device, user input indicating a request to see additional context related to the first subtitle or the second subtitle; and
displaying, by the user device and in response to receiving the request to see additional context, the video in a third mode, wherein displaying the video in the third mode comprises displaying:
the paused video,
the determined received first subtitle in the first language,
the corresponding second subtitle in the second language, and
visual indicia indicating context and usage of at least one word or phrase in the first subtitle.

18. A non-transitory computer readable medium storing instructions that, when executed by one or more processors, cause a user device to perform steps comprising:
receiving a request to display a video;
sending, to a server, a request for a stream of the video;
displaying audiovisual content based on the stream of the video;
receiving a request to pause display of the video at a first event time;
sending, to the server and in response to the request to pause display of the video, a request for a most recent subtitle associated with the video, wherein the most recent subtitle has a corresponding start time less than or equal to the first event time and is in a target language associated with the audiovisual content;
receiving, in response to the request for the most recent subtitle, first response data comprising a target language subtitle that corresponds to the most recent subtitle and is in the target language;
displaying, in response to the request to pause display of the video, the paused video, the received target language subtitle, and a corresponding native language subtitle, wherein at least one of the target language subtitle and the native language subtitle appears in response to the request to pause display of the video, and wherein the native language subtitle corresponds to the target language subtitle and is in a native language that is associated with the user and is different from the target language associated with the audiovisual content;
receiving a request to display additional context corresponding to the target language subtitle; and
displaying, in response to the request to display additional context, visual indicia indicating context and usage of at least one word or phrase of the target language subtitle.

19. The computer-readable medium of claim 18, wherein the visual indicia is generated based on additional context data comprising markup language data associating the at least one word or phrase of the target language subtitle with at least one of: an in-context definition, priority, part of speech, pronunciation, formality, or in-context example sentences.

20. The computer-readable medium of claim 18, wherein the request to pause display of the video is received during a display of the most recent subtitle on the audiovisual content.

* * * * *

UNITED STATES PATENT AND TRADEMARK OFFICE
CERTIFICATE OF CORRECTION

Page 1 of 1

PATENT NO. : 11,109,111 B2
APPLICATION NO. : 16/955523
DATED : August 31, 2021
INVENTOR(S) : Steven Selfors It is certified that error appears in the above-identified patent and that said Letters Patent is hereby corrected as shown below:

In the Claims

Column 38, Claim 17, Line 9:
Please delete "the determined received" and insert --the received-- therefor Signed and Sealed this
Twenty-third Day of November, 2021

Drew Hirshfeld
*Performing the Functions and Duties of the
Under Secretary of Commerce for Intellectual Property and
Director of the United States Patent and Trademark Office*